(12) United States Patent
Cook et al.

(10) Patent No.: US 11,869,056 B2
(45) Date of Patent: Jan. 9, 2024

(54) SYSTEM AND METHOD FOR PRODUCT DESIGN, SIMULATION AND ORDERING

(71) Applicant: Tile Redi, LLC, Charlotte, NC (US)

(72) Inventors: Joseph R. Cook, Lauderdale By the Sea, FL (US); Kristin E. Cook, Lauderdale By the Sea, FL (US); Sean Boes, Charlotte, NC (US); Alex Costa, Coral Springs, FL (US)

(73) Assignee: TILE REDI, LLC, Charlotte, NC (US)

(*) Notice: Subject to any disclaimer, the term of this patent is extended or adjusted under 35 U.S.C. 154(b) by 295 days.

(21) Appl. No.: 17/460,682

(22) Filed: Aug. 30, 2021

(65) Prior Publication Data

US 2023/0065019 A1 Mar. 2, 2023

(51) Int. Cl.
*G06Q 30/06* (2023.01)
*G06Q 30/0601* (2023.01)
(Continued)

(52) U.S. Cl.
CPC ..... *G06Q 30/0621* (2013.01); *G06F 3/04842* (2013.01); *G06F 3/04845* (2013.01);
(Continued)

(58) Field of Classification Search
CPC ........... G06Q 30/0621; G06Q 30/0643; G06Q 30/0283; G06F 3/04842; G06F 3/04845; G06T 19/20
(Continued)

(56) References Cited

U.S. PATENT DOCUMENTS 10,362,219 B2 * 7/2019 Wilson ................ G06F 3/04845
2008/0031499 A1 * 2/2008 Mills ...................... G06T 11/001
382/120
(Continued)

FOREIGN PATENT DOCUMENTS

JP 4402776 B2 * 1/2010 ............. G06F 17/50

OTHER PUBLICATIONS

Huiliang Zhao; Jian Lyu; Xiang Liu; Zhenghong Liu; "Customization-Oriented Product Flexible Manufacturing Experience System Design Based on VR"; IOP Conference Series: Materials Science and Engineering 561: 012098 (7 .). IOP Publishing. (2019) retrieved from Dialog on Aug. 14, 2023 (Year: 2019).*

*Primary Examiner* — Yogesh C Garg
(74) *Attorney, Agent, or Firm* — Moore & Van Allen PLLC

(57) ABSTRACT

Disclosed is a system and method for dynamically designing a custom product. The method is initiated using custom software, which permits user interaction via a graphical user interface. An HTML drawing element is provided in a display area of the graphical user interface, configured to display graphics drawn using a program executable by the computing device, the program comprising instructions to draw the custom product as a plurality of line segments. The program is executed to render the plurality of line segments, which are displayed as a first displayed version of the custom product in the display area. A length dimension value is received in an entry field of the display interface, to update one or more of the line segments. The program is re-executed to render the updated line segments, which are displayed as an updated displayed version of the custom product in the display area.

18 Claims, 14 Drawing Sheets

(51) Int. Cl.
  *G06Q 30/0283* (2023.01)
  *G06F 3/04842* (2022.01)
  *G06T 17/20* (2006.01)
  *G06T 19/20* (2011.01)
  *G06F 3/04845* (2022.01)

(52) U.S. Cl.
  CPC ..... *G06Q 30/0283* (2013.01); *G06Q 30/0643* (2013.01); *G06T 17/205* (2013.01); *G06T 19/20* (2013.01); *G06T 2219/2024* (2013.01)

(58) Field of Classification Search
  USPC ....................................................... 705/26.5
  See application file for complete search history.

(56) References Cited

U.S. PATENT DOCUMENTS

| | | | |
|---|---|---|---|
| 2010/0165407 A1* | 7/2010 | Witkowski | B42D 15/02 358/1.18 |
| 2011/0071805 A1* | 3/2011 | Pendyala | G06F 30/13 703/1 |
| 2019/0114699 A1* | 4/2019 | Cook | G06Q 30/0621 |

* cited by examiner

FIG. 3G

SYSTEM AND METHOD FOR PRODUCT DESIGN, SIMULATION AND ORDERING

CROSS-REFERENCE TO RELATED APPLICATION

N/A

TECHNICAL FIELD

This disclosure relates to a system and method for designing and viewing a simulation of the design of products that are comprised of a single component or multiple components in any number of possible configurations, themes, decors, etc. More particularly, this disclosure relates to a system and method for systematically, rapidly and dynamically designing and creating a virtual representation of a product using visual tools and simulating a three-dimensional, virtual depiction of the product in any number of potential, alternative, in-use environments.

BACKGROUND OF THE INVENTION

For sellers of products, whether those products that are comprised of a single component or multiple alternative components, parts, features and/or configurations, or which are otherwise customizable, making the process of selecting, designing, and/or purchasing the final product by the user easy and convenient is essential to sales success. However, the user must use his or her imagination when the actual product the user desires is not actually (i.e., partially or totally physically installed) or virtually present in front of the user.

This has especially been the case for website and other electronically accessed sales platforms, such as mobile apps and on-site or wide area network applications. The user looking to purchase a product online or using another type of electronically accessed platform (e.g., on a local or wide area network, a mobile app or the like) that has multiple alternative parts, features and/or configurations would like to see what the final product will look like in any one of a number of potential in-use environments when each of the alternative parts, features and/or configurations are included. Heretofore, most such platforms don't have anywhere near that capability.

For example, designing kitchens, bathrooms, showers, shower enclosures and other aspects of kitchens and bathrooms, (along with any other indoor or outdoor areas), involves much planning and decision making. Between thematic, ergonomic and specific componentry (e.g., appliances, sink, drain placement, plumbing fixtures, colors, tiles, sizes, dimensions, shower doors, shower shelves, wall coverings, floor coverings, cabinetry, plumbing fixtures, shower hardware, accessories, kitchen appliances, kitchen accessories, etc., collectively "product components") considerations which are taken into account in designing such installations, an endless number of possibilities could be examined.

However, due to the limitations in the number of potential components that can be made available for a user to choose from when combining them into a potential purchasable product or combinations of products in any number of combinations and viewed in any of a number of alternative configurations, backgrounds, themes, decors, etc., to view online or in any other electronic sales platform during the shopping/design process, the entire range of possible features that a purchaser can view and select from is so greatly limited that more sales are lost than are made and results in more dissatisfied customers.

For example, for a consumer who wants to redesign a bathroom, there is an unacceptably limited universe of potential component products available on bathroom products and home improvement websites. This results in some projects being abandoned altogether, as the necessary level of enthusiasm is never generated by what the consumer believes is a limited range of alternatives. Moreover, for many completed projects that include components that are purchased online, the consumer winds up dissatisfied because the end result does not look and/or function in the manner which the consumer imagined it would. However, had the consumer had a more comprehensive universe of available components to pick and choose from, and a means of trying out and actually viewing as many of those available components in a virtual completed project as the consumer wanted to see, the consumer could have created the exact result he or she had hoped for and envisioned.

Presently, however, no online or other electronically accessible tool exists to assist consumers in the design and real-time viewing of products installed in a setting that resembles the consumer's setting such as kitchens, bathrooms and showers and other indoor and outdoor settings.

Computing and three-dimensional (3D) modeling systems have been used in a limited capacity for building and/or architectural design. In particular, architects and interior designers (or "designers") use a wide range of computer-aided design (CAD) software for designing the aesthetic as well as functional aspects of a given residential or commercial space. For example, a designer might use an architectural design program (e.g., a CAD program) to design the interior layout of a bedroom. The designer might then render the layout to create a 3D model of the interior of the bedroom that can be displayed to a client. However, significant training and experience are required to use CAD programs effectively. Thus, currently there are realistically no effective solutions that enable the average consumer to use a computer aided design tool to design single or multi-component products, while visualizing them in any one of a limitless number of architectures, surroundings, themes, decors, etc., and/or to purchase the product so designed.

In bathroom and shower design, there exist very few options for consumer input to a computer aided design system. Moreover, to the extent that some users have training or experience in the use of typical CAD programs, simultaneous knowledge of typical dimensions used in the industry, and dimensions of available products, is limited. Thus, there is no solution available which enables consumers to use a computer-based tool to efficiently and cost effectively design single or multi-component products, including but not limited to kitchens, bathrooms and showers, while being able to perceive limitless visual 3D representations, renderings or virtual walkthroughs thereof.

Moreover, the few tools which do exist use default imaging that is stretched or snapped to a particular dimension, and therefore does not represent the actual products, and their visual representation, available for selection. It should be appreciated that allowing a consumer to incorporate one of more of a variety of components and their actual images when designing a 3D model of a single or multi-component product, presented in varied or alternative architectures, surroundings, configurations, themes, décor, including but not limited to kitchens, bathrooms and showers, and to be able to vary and switch at will between and among alternative architectures, surroundings, themes, components, decors, etc., will result in a more visually appealing model, and improve efficiency in product selection, design and purchase, while more accurately reflecting a real-world model of what the product would look like in use.

Accordingly, an advantage in the art can be realized with systems, methods and computer program products that are easy to use and do not require training and experience, allow for designing first using available product selections and dimensions, and, optionally, creating customized products as desired, while providing a real world visual representation, visualization or simulation of the product for more effective and efficient product selection to better match consumer expectations with the real-world completed design.

SUMMARY

Embodiments described herein relate to a system and method for presenting to consumers a large universe of available products and/or components for multi-component products, and for permitting consumers to select products and components for and ultimately construct, component-by-component, virtual renditions of products, and view real world 3D simulations of the finished products. The system causes the universe of available components to change each time a consumer selects a component. The rendition of the product changes in real time each time the selection of a component, architecture, surrounding, theme, layout, location, décor, placement, configuration, environment, etc. is made.

For example, in the case of a multi-component product, as the consumer selects a particular component, any components that are incompatible with the selected component are taken out of the universe of remaining available components, and the rendition displayed to the consumer of the product (or portion of the product being created) is updated. Once the consumer selects all of the components for a given product, and has viewed the finished virtual 3D rendering thereof, the consumer can order the product, or modify the product by deleting and/or adding components from any level of the selection process.

In one implementation of the invention, the system is an online, image-based, virtual design, selection and shopping/purchasing experience that permits consumers to easily peruse choices of single-component products.

In another implementation of the invention, the system is an online, image-based, virtual design, selection and shopping/purchasing experience that permits consumers to easily peruse choices of components of multi-component products. In another implementation of the invention, the resulting product is a finished bathroom or shower. A webpage or other graphical user interface (collectively hereinafter "GUI" or "webpage") is made available for access by consumers, who are sometimes referred to herein as "users." A plurality of base image choices are presented on the GUI. A base image may be a depiction of an environment for the product, such as a graphical representation of a bathroom. The base images represent the basic architecture of a bathroom, into which the components of a shower can be installed, component by component, by the user. The base images may include, but need not necessarily include, and are not limited to, a variety of different themes or decors, a variety of different background features, and a variety of architectural configurations. The base images may also include one or more blank areas into which the user may cause the system to populate one or more products or product components. For example, the one or more blank areas may be where a shower or portion of a shower is to be placed, or where one or more cabinets, doors, screens, niches, bathtubs, etc. may be placed by the user using the system.

Once a particular base image is selected, the user is prompted to begin the process of selecting and/or modifying parameters for the finished bathroom or shower product, such as one or more of the following, by way of example and not limitation: dimensions, drain position, curb style, drain grate style, curb width, benches, niches, doors, glass panels, hardware, vanities, fixtures, wall and floor coverings and accessories.

The user can begin the component selection process at any level. For example, in an embodiment, the user selects a base image, then can first select a drain location, then a type of drain, then the type of shower pan, then the dimensions of the shower pan.

Alternatively, in another embodiment, the user can select the pan type, then select the pan dimensions, then the drain location, then the drain type, and so forth.

Alternatively, in still another embodiment, the user can select shower doors, shower screens, shower hardware, décor, or any other things that may be selected for inclusion in a bathroom product.

In other embodiments, as will be discussed more fully hereinafter, the user can change the theme or décor of the base image at any stage in the process of selecting components or features/attributes of components.

In an embodiment, a matrix is populated with all of the possible environments, backgrounds, architectures, configurations, themes and/or decors, and the same or one or more other matrices are populated with the components available for the user to incorporate into a product to be virtually built by the user.

In another implementation of the invention, the resulting product is a finished kitchen. A webpage is made available for access by consumers. A plurality of base image choices is presented on the webpage. A base image may be a depiction of an environment for the product, such as a graphical representation of a kitchen. The base images represent the basic architecture of a kitchen, into which the components of a kitchen can be installed, component by component, by the user. The base images may include, but are not limited to, a variety of different backgrounds, themes or decors, and a variety of architectural configurations. The base images may also include one or more blank areas into which the user may cause the system to populate one or more products or product components. For example, the one or more blank areas may be where an appliance or portion of an appliance is to be placed, or where one or more cabinets, countertop(s), doors, niches, furniture, wall and/or floor coverings, accessories, lighting, etc. may be placed by a user using the system.

Once a particular base image is selected, the user is prompted to begin the process of selecting and/or modifying parameters for the kitchen or kitchen product, such as dimensions, appliance position(s), cabinet style, appliance brands, counter tops, wall and/or floor coverings, accessories, lighting, etc.

The user can begin the component selection process at any level. For example, in an embodiment, the user selects a base image, then can first select a sink or other fixture or appliance location, then cabinets, then the type of counter top, then the dimensions of the cabinets and/or counters, etc.

Alternatively, in another embodiment, the user can select the room dimensions, then the location of windows, doors, etc., then select the appliance type/style/color/finish, etc., then the counters, then cabinets, then accessories, lighting, furniture, etc., and so forth.

In embodiments, as will be discussed more fully hereinafter, the user can change the architecture, configuration, theme and/or décor of the base image at any stage in the process of selecting components or features/attributes of components.

In embodiments, a matrix is populated with all of the possible environments, themes, decors, architectures and/or configurations, and the same or one or more other matrices are populated with the components available for the user to incorporate into a product to be virtually built by the user and any indoor or outdoor environment.

In some embodiments, the base image, depicting the environment and/or architecture, is displayed in a first visual representation area (for example in a first area of the display screen), and the various component part or other product options/offerings for the user to choose from (or links to open images thereof) are displayed in the first visual representation area or in one or more additional separate visual representation areas (for example in a second area of the display screen, or in second, third, etc. display areas) on the same page. As the user makes his or her selection(s) from among the available component parts and/or products, the base image appearing in the first visual representation area is updated, augmented and/or modified with the component part selection(s) to create a visual representation of the product being virtually assembled.

The term "updated" as it pertains to the first visual representation area refers to the change and/or alteration of the visual display in the first visual representation area. At one or more points during the selection process, the base image is modified to incorporate the different selection(s) made by the user. In at least one embodiment, the base image is not updated until the user makes the final selection and/or instructs the system to update the image.

In embodiments where one or more blank spaces are included in the base images, as the user makes his or her selection(s) from among the available component parts and/or products, the base image appearing in the first visual representation area is updated, augmented and/or modified with the component part selection(s) being reproduced in the one or more blank areas to create a visual representation of the product being virtually assembled.

In other embodiments, the base image, depicting the environment, is displayed in a first visual representation area (for example in a first area of the display screen), and the various product and/or component part options/offerings for the user to choose from (or links to open images thereof) are displayed in one or more visual representation areas (for example in a second area of the display screen, or in second, third, etc. display areas) on one or more different pages. As the user makes his or her selection(s) from among the available products and/or component parts, the available products and/or component parts are displayed on a separate page, and, once the additional product(s) and/or component part(s) are selected, the base image appearing in the first visual representation area is updated, augmented and/or modified with the products and/or component part selection(s) to create a visual representation of the product being virtually assembled.

In embodiments, a system of the invention permits a user to shop for a product or products, to select the environment and/or background in which the product or products will be depicted and/or rendered, and to also pick from any number of alternative architectures, configurations, themes, decors, lighting, or other characteristics in which said environment and/or background can be displayed, which permits for the user to best visualize the in-use appearance of the product or products. Doing so offers the user a far more robust shopping experience, one which heretofore has never existed. Allowing the user the opportunity to customize the environment and/or background in which the product or products will be used or installed permits the consumer to have an experience that most closely resembles the actual experience the user will have after the product is purchased.

In yet another embodiment, a system of the invention permits a user to design and build a virtual product from a myriad of component styles and parts, and to render an image of the product as it is being built in the environment and or background selected by the consumer.

Further, the user can change among environments or backgrounds during the process as often as desired.

Further, the system can be used to shop for single or multi-component products while selectively rendering such products in a variety of alternative backgrounds or environments.

The terms "updated," "augmented" and "modified" refer to the change and/or alteration of the visual display in a visual representation area, and may be used interchangeably. At one or more points during the selection process, the base image may be simultaneously or at a later time modified to incorporate the different selection(s) made by the user. In at least one embodiment, the base image is not updated until the user makes the final selection and/or instructs the system to update the image.

BRIEF DESCRIPTION OF THE DRAWINGS

For a more complete understanding of the present disclosure and its advantages, reference is now made to the following descriptions, taken in conjunction with the accompanying drawings, in which:

FIG. 3G shows a seventh wire frame of a sequence of an embodiment of the invention.

Similar reference numerals refer to similar parts throughout the several views of the drawings.

DETAILED DESCRIPTION

Figure 1:
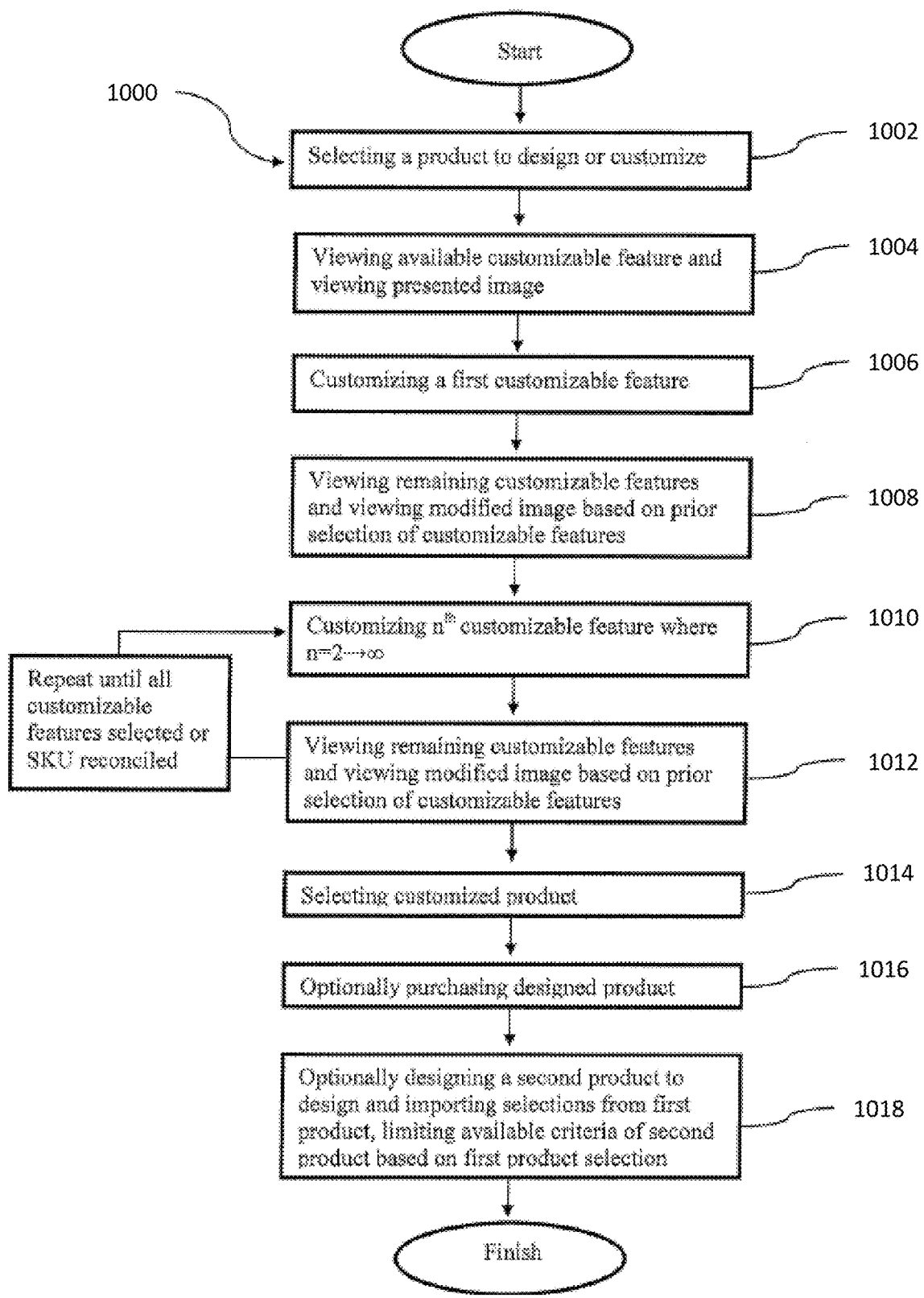
FIG. 1 illustrates a block flow diagram of an embodiment of the inventive method illustrating user inputs.

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

It should be understood by those of skill in the art that flowcharts and block diagrams herein described may illustrate architecture, algorithms, functionality and operation of possible implementations of systems, methods and computer program products according to various embodiments. Therefore, it should be understood that each block in the flowchart or block diagram may represent a module, segment or portion of code, which comprises one or more executable computer program instructions for implementing the specified logical function or functions. One or more of the blocks can be changed, deleted, or the order of their presentation or use can be changed to any other order. Further, some implementations may include the functions in the blocks occurring out of the order as herein presented, or not in order of execution when a user operates the system. By way of non-limiting example, two blocks shown in succession may be executed substantially concurrently, or the blocks may at times be executed in the order shown or the reverse order, depending upon the functionality involved. It will also be noted that each block of the block diagrams and flowcharts, and combinations of blocks in the block diagram and flowcharts, may be implemented by special purpose hardware-based systems that perform the specified functions or acts, or combinations of special purpose hardware and computer program instructions.

Various terms used throughout the specification and claims are defined as set forth below as it may be helpful to an understanding of the invention.

As used herein a "computing device" shall be a desktop computer, a laptop computer, a dedicated server or server network, a personal digital assistant, a cellular telephone, a set-top box, a music player, a web pad, a tablet computer system, a game console, an electronic book reader, a smartphone, or other type of device with like capability. At a minimum, a computing device has at least one of an identification number, a data storage system, an operating system, a central processing unit (CPU), and an input-output (I/O) system capable of communicating to the network.

As used herein "user" shall mean any prospective or actual shopper for a product that the systems and methods disclosed herein are capable of designing, ordering, creating or purchasing. For example, a user can be a buyer of retail products, a wholesale business, a manufacturer, or any party looking to buy a component product. The terms "consumer" and "user" are used interchangeably in this disclosure.

As used herein a "network" shall be the Internet, intranets, extranets, wide area networks (WANs), local area networks (LANs), wired networks, wireless networks, or other suitable networks, or any combination thereof.

As used herein a "product" [the ultimate thing being created through the process of selection, design and/or purchase as described herein] may be any article, tangible personal property (such as furniture, equipment, room, fixture, appliance, plumbing device, accessory of any type, any combination of products or components in any configuration, environment, theme, décor, etc.) or other thing that is manufactured for retail, wholesale, industrial or any other sale or disposition.

As used herein a "server" may be a server computer or any other system providing computing capability. Alternatively, a plurality of servers may be employed that are arranged, for example, in one or more server banks or computer banks or other arrangements. A server may otherwise be a cloud computing resource, a grid computing resource, and/or any other distributed computing arrangement. Such servers may be located in a single installation or may be distributed among many different geographical locations. For purposes of convenience, "server" is referred to herein in the singular. Even though the server is referred to in the singular, it is understood that a plurality of servers may be employed in the various arrangements as described herein.

As used herein "software" shall mean any machine code, source code, object code, software module or modules, application programming interface or interfaces, executables or other "software" known in the art or in any appropriate computer language.

As used herein a "central processing unit" or "processor" may represent multiple processors, and each "memory" or "data storage system" may represent multiple memories which operate in parallel processing circuits, respectively. The method and system includes one or more processing devices, which may be any computer processing unit, and could be a single central processing unit, or a number of processing units configured to operate either in sequence or in parallel. The processing device can be configured to execute software processes which implement the steps disclosed herein. The system and method may also include a memory capable of storing the instructions necessary for a processing device to implement the steps disclosed herein. This memory could be in the form of memory resident within the processing device or in the form of standalone memory coupled to the processing unit via a communication path, such as a bus or a network.

The systems and methods disclosed herein provide a computer-implemented process for designing and virtually assembling products that are comprised of multiple components. In embodiments, the designing process includes receiving comprehensive information about specific product(s), product components and accessories based on a user's input, and displaying the products based on the user's selections. In embodiments, the designing process includes receiving component choices for inclusion in one or more specific multi-component product(s), and, based on a user's input, displaying the one or more component choices and/or products based on the user's selections.

A dynamic, customizable library system, which may be searchable, is used to store and provide product information, and base images therewith, for products, components and accessories. Upon or after commencement of the design, selection and/or purchase of a product, component or accessory, a base image is presented, which is then updated, augmented or modified by the over layering of additional component image layers, superimposing of additional component images, addition of component images, creation of new images, or any other means for updating, augmenting or modifying the image based on the user's selections and choices in the design process. The inventive systems and methods allow for a user-friendly experience for selecting products, and/or designing products, and/or, optionally, customizing products as desired, and/or purchasing products, while providing a real world, real-time visual representation and interaction with the resulting product for a more effective and efficient product selection experience in which a real-world completed product is displayed in an attractive environment.

Systems and methods of this invention can be implemented using one or more customizable library systems, which allow the customization of the presentation by, for example, changing the sequencing of the presentation of the design, selection or purchase of components or the products, or the experience, enlarging or reducing the number of products or components of products to be displayed, all to suit particular customers or circumstances. Thus, a system can be devised in accordance with one or more principles of the invention which enables a provider of products to tailor and customize the experience for consumers, buyers, wholesalers, distributors, online retailers, brick and mortar retailers, as required by the exigencies of the market or the needs of the provider, at any particular time or place.

Systems

In one embodiment, there is disclosed a system for dynamically designing products that are comprised of multiple components. In this particular embodiment, but not by way of limitation, the system at least includes a computing device running custom software for designing products that are comprised of multiple components. The custom software furthermore interacts with at least one database. The at least one database contains information related to available products and the components thereof, base images for available product environments and/or backgrounds, complete stand-alone images and/or images compiled through image layering or any other technology for manipulating or otherwise updating, augmenting or modifying images to depict available product components, selectable or modifiable optional criteria and subcomponents for available products, and design selections for the modifiable optional criteria and subcomponents. Various product information and data may be stored in the database. The database may be representative of a plurality of databases as can be appreciated. In some embodiments, the database or library includes information, by way of example but not limitation, related to products, optional components and accessories, such as one or more of manufacturer name, dimensions, material, finish, color, images, base images, component location information, etc., for product component images, standalone product images, specification of products, components or accessories, costs, stock keeping unit numbers (sku's), etc., or combinations thereof.

At least one embodiment of the custom software, or as may otherwise be herein described, provides a base image representing the base architecture or configuration of an environment or background in which the product will be used, installed or otherwise employed. At least another embodiment of the custom software, or as may otherwise be herein described, provides a base image representing the base architecture or configuration of an environment in which the product will be depicted.

In an embodiment, upon selection of one of the available base images, and selection of one of the available themes or decors for the environment or background in which the multi-component product will be depicted, at least two of the components of the multi-component product to be designed are selected, and as a result of which the software either selects an image that depicts the combined products in the environment and/or combines the image(s) of the product components with the base image of the environment or background to provide a visual representation of the product at a partial or completed stage of design in the environment or background of the user's choosing. The visual representation created by such images may be created by substituting one image for another image, and/or over layering of the image layers for available product components with a base image, or any other means of combining or representing the component images, thereby providing a dramatic visual experience to assist the user in their design, selection, shopping, and/or purchasing process.

In another embodiment, upon selection of one of the available base images, and selection of one of the available themes or decors for the environment or background in which the multi-component product will be depicted, at least two of the components of the multi-component product to be designed are selected, as a result of which the software superimposes one or more additional component images on the original image layer to provide a visual representation of the product at a partial or completed stage of design. The visual representation created by such superimposing provides a dramatic visual experience to assist the user in his/her design, selection, shopping, and/or purchasing process.

In another embodiment, upon selection of one of the available base images, and selection of one of the available themes or decors for the environment in which the multi-component product will be depicted, at least two of the components of the multi-component product to be designed are selected by the user, as a result of which the software creates a new image which includes any additional components selected by the to provide a visual representation of the product at a partial or completed stage of design. The visual representation created by such image creation provides a dramatic visual experience to assist the user in his/her shopping process.

Optionally, the visual representation is representative of a custom product to be fabricated based on the selections of the background or environment/base layer and optional components.

In embodiments, the system can be an isolated, self-contained computing device all inclusive of the database and custom software, one or more input devices such as one or more keyboards, one or more graphical user interfaces, one or more microphones, or the like, and one or more displays.

Alternatively, the system can be comprised of a distributed computing device/system that is remotely running software, from a remote location, or through executable functions within a browser running a web application.

Still alternatively, the system can be comprised of any combination of an isolated, self-contained computing device all inclusive of the database and custom software, one or more graphical user interfaces, one or more input devices such as one or more keyboards, one or more microphones, or the like, and one or more displays, on the one hand, and a distributed computing device/system that is remotely running software, from a remote location, or through executable functions within a browser running a web application In at least one embodiment, the system further includes a communication network having at least one of a cellular data network and a Wi-Fi network, wherein said computing device and said software are in communication with at least one server using the communication network. In at least one embodiment, the server contains the database of product, theme and decor information, including modifiable components or accessories.

In systems utilizing a server, the server executes one or more SQL queries to find matching product components stored within the database on the server, and returns results to the system's software to be displayed on the display associated with the computing device running the system's software. In some embodiments, the server is further used to store certain profile information for one or more users. The profile information may include the user's name, business name and address, project name, customer name, a database location for storing the designed products by the user, payment information, contact information, and/or previous designs or purchases. In at least one embodiment, users have the ability to store or share product designs such that one or more users may access certain product designs that have been saved by a user.

Various other applications and/or other functionality may be executed on the server according to various embodiments.

Custom Software/Product Design Method

In an embodiment, the software for designing products, whether single component products or products that are comprised of multiple components or accessories, may include instructions, protocols and/or subroutines to interpret commands from a user's input, to process corresponding data, and to run the essential executable code or commands therewith. The software also provides at least one interactive graphical user interface driver for the selection and display of various images chosen. A user may interact with the graphical user interface in any manner, such as with touch commands, with a mouse, a keyboard, with voice commands, or any other controller. The software allows a user to design and/or customize products based on modifiable features representing available products or components of products, or to create custom products to be fabricated for the user upon completion of the design. The software is provided to enable a user to select search parameters, and sends user parameters to a central processing unit, a database, or a server.

In at least one embodiment, two or more separate visual representation areas are incorporated into the display(s) associated with the system. A first visual representation area permits the display of the base image. A second (and optionally third or more) visual representation area permits visual display of one or more available selectable components of a product being designed for the user to choose from. The various available selectable components may be displayed in either a two-dimensional visualization, where each alternative selection is in a simplified form such a line-art drawing (e.g., wireframe), or the like. Or, in the alternative, the selectable components may be displayed in a more complex format, such as a three-dimensional graphical representation, or the like. Each visual representation area may function as a graphical user interface to allow for the user to interact with touch commands, with a mouse, with voice commands, with a keyboard or any other controller.

In at least one embodiment, the user interface of the software includes search tools to enable a user to select preferences, search criteria, or review information related to products, components or accessories. For designing products, the software first provides a user an option for the selection of at least one product to design or to render in any one or more particular architectures, backgrounds, configurations, themes, decors, etc. Upon the selection of: (1) a product type to be designed and/or rendered; (2) a base image embodying a depiction of an architectural environment, background and/or configuration; and (3) a theme or décor for the environment, background and/or configuration, the graphical user interface displays a page containing the first visual representation area in which the base layer is displayed, depicting an architectural environment or background in which the virtual depiction of the product to be ordered will be rendered, displayed, incorporated or installed. In embodiments in which multi-component products are being designed, at least a second visual representation area adapted to depict one or more components of the product is displayed, and the user prompted to select from one or more choices, sequentially, until the user has added all of the components and/or features to the product that the user wishes to have embodied in the actual product to be viewed and/or ordered.

In embodiments, a list of optional criteria for the product is then presented which includes modifiable or customizable options for the product, available components, or available accessories. Without any constraints to a particular selection order, each optional criteria is linked to a base image or portion of a base image which is then updated and/or augmented by the over layering of additional component image layers, superimposing of additional component images, addition of component images, or creation of new images, to provide a visual representation of the design modification or addition made by the selection of the optional criteria.

In at least one embodiment, the universe or inventory of remaining optional criteria is adjusted based on the first optional criterion selected. In at least one embodiment, the optional criteria may be adjusted and/or customized in any order as may be desired by a user, and it should be appreciated that, in doing so, a different design experience, and available choices therewith, is dependent upon the order in which the optional criteria is adjusted.

In at least one embodiment, the universe or inventory of remaining optional criteria is adjusted based on the first optional criterion selected. In at least one embodiment, the universe or inventory of remaining optional criteria may be adjusted and/or customized in any order as may be desired by a user, and it should be appreciated that, in doing so, a different design experience, and available choices therewith, is dependent upon the order in which the optional criteria is selected. In embodiments utilizing two separate visual representation areas, the visual representation of the optional criteria is depicted in an independent representation area that is separate from the representation area in which the base image is depicted. By displaying the base image in separate representation area from the optional criteria, the user is able to visualize the possible variations prior to the variations being incorporated into the base image and/or design of the product.

It is to be appreciated that the representation areas may each be a separate graphical user interface from the other representation areas, rendered on the same screen or additional screens to the screen on which the first representation area appears.

In at least one embodiment, the base image is automatically updated between each selection of optional criteria. In other embodiments, the base image is not updated until the final selection is made. In other embodiments, the user may be able to decide at different points in the selection process whether or not to incorporate the chosen optional criteria into the base image.

In at least one embodiment, the optional criteria depicted within the independent visual depiction area is modified between selections in order to display the subsequent optional criteria for the user to select from.

Example 1

The systems and methods of the invention have useful application to the design and ordering of household goods, such as kitchen and bathrooms, kitchen and bathroom fixtures, appliances and other constructs, including partial and entire decorated rooms and other living spaces, as well as any indoor or outdoor environments.

In one embodiment, the system is a one-page, image-based, virtual selection, design, shopping, and/or purchasing experience that easily guides users through the choices of bathroom shower base and floor systems, enclosures, upgrades, add-ons and accessories for both inventoried and custom products. The innovative dynamic experience of this embodiment is easy and fun, and users may use the system to visually see their complete shower fully installed in a bathroom with the user's choice of décor, architectural layout, theme, etc. While the description in this example starts with the selection of a shower base, the dynamic design of the system and method allows a user to start at any point (i.e., point 1, point 2, point 3, etc.) in the process and have each of their choices and dimensions carry forward to any subsequent product category they wish to shop within.

In this example, the design employs images to support the visual experience. A "base image" is used, which is the basic architecture of a bathroom. The system, in a preferred embodiment, presents the user with an assortment of varied base bathroom configurations and/or backgrounds to choose from. In embodiments, the user can switch between the varied configurations and/or backgrounds at any time during the design, selection and purchasing process. The assortment of available base bathroom configurations and/or backgrounds from which the user may choose can be as varied as the imagination. Any basic room shape and size is contemplated. The configurations and/or backgrounds offered to the user from which to choose may accommodate all possible types and configurations of the planned bathroom and/or shower product configurations. Each of the exemplary customer choices listed below is supported by an image or image layer that is stacked on top of, or otherwise combined with or added to, the base layer to create the shower design a user desires. For example, when choosing a shower drain position, there are images in the database from which the user may choose that include a shower pan floor to selectively fit any possible architecture, regardless of whether the user selects a drain located in either the right, left, center, back or any other location on the shower base.

The addition of a feature, part or accessory to, or the modification of, the base image/environment/background is referred to herein as the selection or designation of an "optional criteria." Any number of optional criteria may be made available by the system, and different sets of optional criteria may be created and offered in any given setting. For example, a supplier of a particular product may tailor a private label product offering using the teachings of this invention by limiting the universe of optional criteria from that offered by the supplier under the supplier's own brand, and vice versa.

In embodiments, the selection of an optional criteria changes the universe of remaining optional criteria to eliminate from said universe those features, parts or accessories that are incompatible with the base image or optional criteria already chosen by the user or the system.

In another example, the design employs images to support the visual experience. A "base image" is used, which is the basic architecture of a shower within a bathroom, for all possible configurations of the existing and planned shower base product configurations. Each of the exemplary customer choices is supported by an image that is incorporated into, e.g., added to, rendered in a new image with, or otherwise combined with, the base layer to create the shower design a user desires. For example, when choosing a shower drain position, there are images in the database from which the customer may choose that include the shower pan floor to selectively fit each of the architectures having a drain located in either the right, left, center, back or any other location on the shower base.

In some embodiments, the base image incorporates one or more blank spaces where optional criteria, i.e., features, parts or accessories, can be added to the product being designed. The system combines the features, parts or accessories with the base image as optional criteria are selected by the user in such a way that the user builds the product part-by-part, accessory-by-accessory and feature-by-feature by filling in or populating the blank spaces with the features, parts or accessories selected by the user.

In embodiments, programming rules focus on allowing for options based on product attributes that will drill down to an existing inventory SKU; however, where custom product manufacturing is available, the customer is notified of such and may select custom options. In one embodiment, the program code may cause inventory options to be defaulted to standard, stocked, inventory components in order to encourage customers in that direction, while in another embodiment to be defaulted to customized options to encourage customers to view, design, select and/or purchase custom products. The customer may also be informed optionally of any difference in pricing between custom products and inventory products for a more informed design, selection, shopping and/or purchasing experience. Optionally, the program steps may simply allow the customer to direct the ordering process as the customer sees fit. If, for example, a customer chooses a particular shower pan configuration, for example with a right drain, in the first alternative pathway referenced above, there is only one choice available and customers will not see other incompatible component options listed (meaning options that do not accommodate, contemplate or incorporate a right drain); however, the system may be set up such that, if the consumer desires, he or she can choose a "custom" option and choose from other component options.

FIG. 1 illustrates a method 1000 according to an embodiment of the present disclosure. The method 1000 may comprise the following steps.

At step 1002, a product is selected to design or customize. The product may comprise household goods, such as kitchen and bathrooms, kitchen and bathroom fixtures, appliances and other constructs, including partial and entire decorated rooms and other living spaces, as well as any indoor or outdoor environments.

At step 1004, available customizable features and a presented image are viewed. According to the product selected to customize, the product may have a plurality of customizable features. The plurality of customizable features may be displayed for viewing to the user. A presented image of the product may be displayed for the user to view. The available customizable features may be identified in the presented image.

At step 1006, a first customizable feature is customized. The user may select a first customizable feature of the available customizable features, and may modify the first customizable feature according to user requirements. For example, the user may be presented with a number of options corresponding to the first customizable feature, and the user may select one or more of the options to customize the first customizable feature of the product.

At step 1008, remaining customizable features and a modified image based on the prior selection of customizable features is viewed. After the first customizable feature is customized, the presented image may be modified based on the user selection to produce a modified image. The user may be presented with the remaining customizable features to further customize the product according to user requirements.

At step 1010, the nth customizable feature is customized. The n customizable features may range from 2 to $\infty$. The number of customizable features available to be customized may depend on the particular product to be customized. For each of the n customizable features, the user may be presented with a number of options corresponded to the selected feature, and the user may select one or more options to customize each customizable feature of the product.

At step 1012, remaining customizable features and a modified image based on the prior selection of customizable features is viewed. It can be appreciated that steps 1008-1010 may be repeated to display the modified image after each of the n customizable features is customized, and to present the user with remaining customizable features to further customize the product according to user requirements.

According to an embodiment of the present disclosure, steps 1008-1010 may be repeated until a SKU is reconciled. As each customizable feature is customized, the product may be compared to the features available product SKUs. When the customized product matches or is similar to one or more of the available products SKUs, the SKU may be identified and presented to the user.

At step 1014, the customized product is selected. The user may select the customized product at any time, when selection of customizable features is completed. The selection of the customized product may correspond to selection of the custom product or to a product SKU identified as matching or being similar to the custom product.

According to an embodiment of the present disclosure, the method 1000 may further comprise the following step. At step 1016, the designed product may be purchased. For example, an option to purchase may be provided to the user after the customized product is selected. The option to purchase may correspond to the custom product or to a product SKU identified as matching or being similar to the custom product. The option to purchase may be embodied as a selectable button on the screen, which allows the user to proceed with a checkout process after selecting the button.

According to an embodiment of the present disclosure, the method 1000 may further comprise the following step. At step 1018, a second product may be designed. The second product may be the same as the first designed product, similar to the first design product, or different from the first designed product. The selections made from the first designed product may be imported for the second designed product. As such, the user may begin the design process for the second designed product based on the selections made for the first designed product. The available criteria of the second product may be limited based on the first product selections. For example, the available criteria of the second product may be limited to aesthetically match the first product or to physically fit with the first product. Accordingly, the user may be able to design additional custom products according to user requirements.

With the method 1000 of the present disclosure, a user may intuitively design or customize a product according to user requirements, by individually customizing each customizable feature and viewing a modified image of the product based on the user selections.

Figure 2:
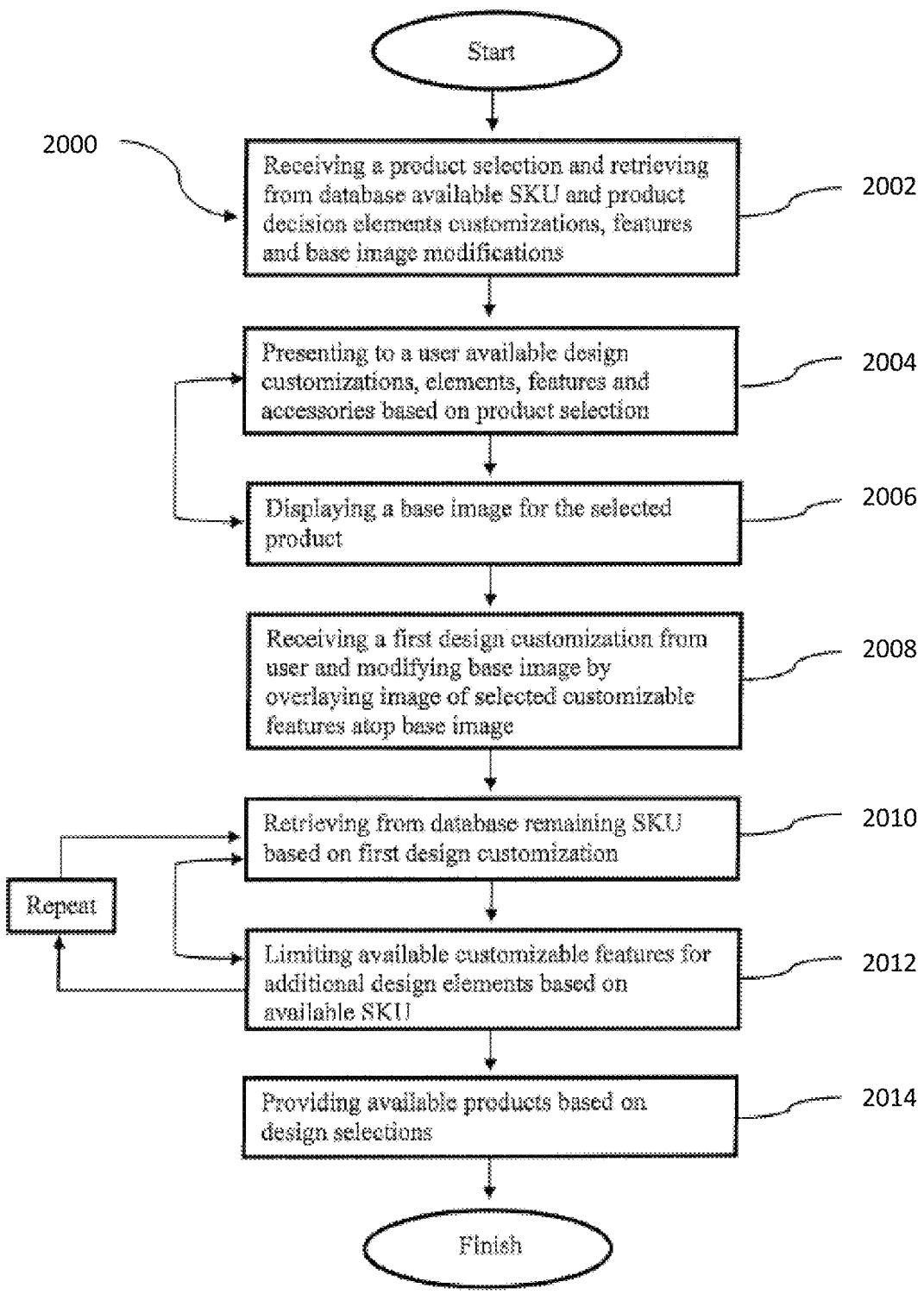
FIG. 2 illustrates a block flow diagram of an embodiment of the inventive method illustrating responses by the method and system based on the user inputs.

FIG. 2 illustrates a method 2000 according to an embodiment of the present disclosure. The method 2000 may comprise the following steps.

At step 2002, a product selection is received, and available SKU and product decision elements, customizations, features, and base image modifications are retrieved. For example, a user may select a product to customize. The product may comprise household goods, such as kitchen and bathrooms, kitchen and bathroom fixtures, appliances and other constructs, including partial and entire decorated rooms and other living spaces, as well as any indoor or outdoor environments. Each customizable product may have a defined set of customizable features, which are presented to the user.

At step 2004, available design customizations, elements, features, and accessories are presented to the user based on product selection. For example, each of the retrieved available SKU and product decision elements, customizations, features, and base image modifications may be presented to the user.

At step 2006, a base image for the selected product is displayed. The base image may comprise one or more views of the selected product. The available design customizations, elements, features, and accessories may be identified in the base image for the selected product. According to an embodiment of the present disclosure, step 2006 may be performed before step 2004, or may be performed substantially simultaneous to step 2004.

At step 2008, a first design customization is received from the user, and the based image is modified by overlaying an image of selected customizable features atop the base image. For example, when a user selects a customizable feature, a corresponding base image modification is retrieved, and the corresponding base image modification is layered on top of the base image. By layering the base image modification atop the base image, the image of the product may be easily modified, so the user may easily inspect visual changes to the custom product based on the selected design customizations.

At step 2010, remaining SKU are retrieved from the database based on the first design customization. For example, the database of available product SKU may be filtered based on the received first design customization. In this way, only the available product SKU that comply with the first design customization may be presented for further processing.

At step 2012, available customizable features for additional design elements are limited based on available SKU. For example, the available product SKU may have a limited set of customizable design features. In this way, the customizable design features presented to the user may be further limited based on the available SKU, to further narrow the design options for the user.

Steps 2008-2012 may be repeated, to receive additional design customizations from the user, display a further modified based image, retrieve available SKU based on the additional design customizations, and further limit the available customizable features. It can be appreciated that these steps may allow the user to progressively design a custom product based on individual selections of customizable features, which are further limited based on available SKUs after each selection.

At step 2014, available products based on design selections are provided to the user. The available product SKU are filtered after each design customization, and the available products that remain after all of the design selections are presented to the user. In this way, the design process may guide the user to filter the database of available products to determine products that satisfy user requirements.

With the method 2000 of the preset disclosure, a user may intuitively customize a product by selecting customized features, and a modified based image is overlaid atop a base image to portray the customize product to the user. Based on the design selections made by the user, the user may be presented with available product SKU, to allow the user to select an available product that corresponds to the design selections.

FIGS. 3A-3I are wireframes of representative web pages depicting an operation and flow of at least one embodiment of the inventive system and method suitable for use in allowing a customer to design the look and configuration of a bathroom shower.

Figure 3A:
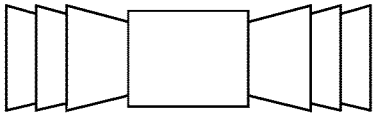
FIG. 3A shows a first wire frame of a sequence of an embodiment of the computer implemented method of the invention.

FIG. 3A illustrates a screen display, e.g., a web page, through which a prospective customer can select components of a bathroom product, e.g., shower, to design, showing the available shower pan configurations for the user to select from. The user is presented the option to select a theme or "décor" for the environment or room that the shower to be built will be depicted in. That environment or room may be displayed in first visual representation area 100. Alternative environments may be offered as choices. The environment may be the architectural configuration of a portion or all of a bathroom depicted in photo-realistic graphics, or any other media for depicting the environment in which the shower will be depicted for a consumer to see. The buttons 102a-102m represent décor visual representation areas, each of which depicts a different décor, such as "classic," contemporary," "country chic," "modern," "urban industrial" and/or any other décor in which the background or environment may be depicted. Selecting any one of these buttons will result in the environment in which the shower will be depicted for the customer to see in first visual representation area 100 being converted to the stated décor, e.g., "classic," contemporary," "country chic," urban industrial" or any other limitless styles, themes or décor.

In some embodiments, the first visual representation area 100 incorporates one or more blank spaces where the product, or features, parts or accessories thereof or therefore, can be incorporated into the image in response to the user's selections and the system(s) and methods of the invention.

As with many of the embodiments disclosed herein, a customizable library system is employed, permitting the user to customize the presentation to change the sequencing of the products or experience, enlarge or shrink/reduce the number of products to be displayed, all to suite a particular user or circumstance. A user can instantly change between theme and/or decors at the beginning of the selection process, or, optionally, at any time during the selection/design process, by clicking or otherwise selecting an option to change decors.

Second visual representation areas 202-209 may be used to provide buttons/links to specific shower components and/or features, such as shower dimensions, pan model, product series, mounting options, direction of door motion (i.e., left swing, right swing), glass style, hardware options, hardware finish, additional shower or bathroom hardware, and the like. In an embodiment, selecting the "dimensions" button will cause a drop-down menu or other selection list 216 to display available dimensions for the shower to be displayed. From such selection list 216, the user selects the dimensions of the shower being designed. In an embodiment, upon selection of shower dimensions, the graphical representation of the architecture of the bathroom shown in first visual representation area 100 will be changed in real time so that the depicted shower area matches or otherwise becomes compatible with the basic shape of the shower selected by the user.

In some embodiments, the second visual representation areas 202-209 incorporate one or more blank spaces in some or all of the displayed available optional criteria, i.e., features, parts or accessories, where other optional criteria, i.e., features, parts or accessories, can be incorporated into the selected or pre-existing optional criteria. The system combines the features, parts or accessories selected by the user with the chosen optional criteria in such a way that the user builds the optional criteria part-by-part, accessory-by-accessory and feature-by-feature by filling in or populating the blank spaces in the optional criteria with additional features, parts or accessories, including sub-features, parts or accessories, for eventual incorporation into the product being designed, selected and/or purchased.

Figure 3B:
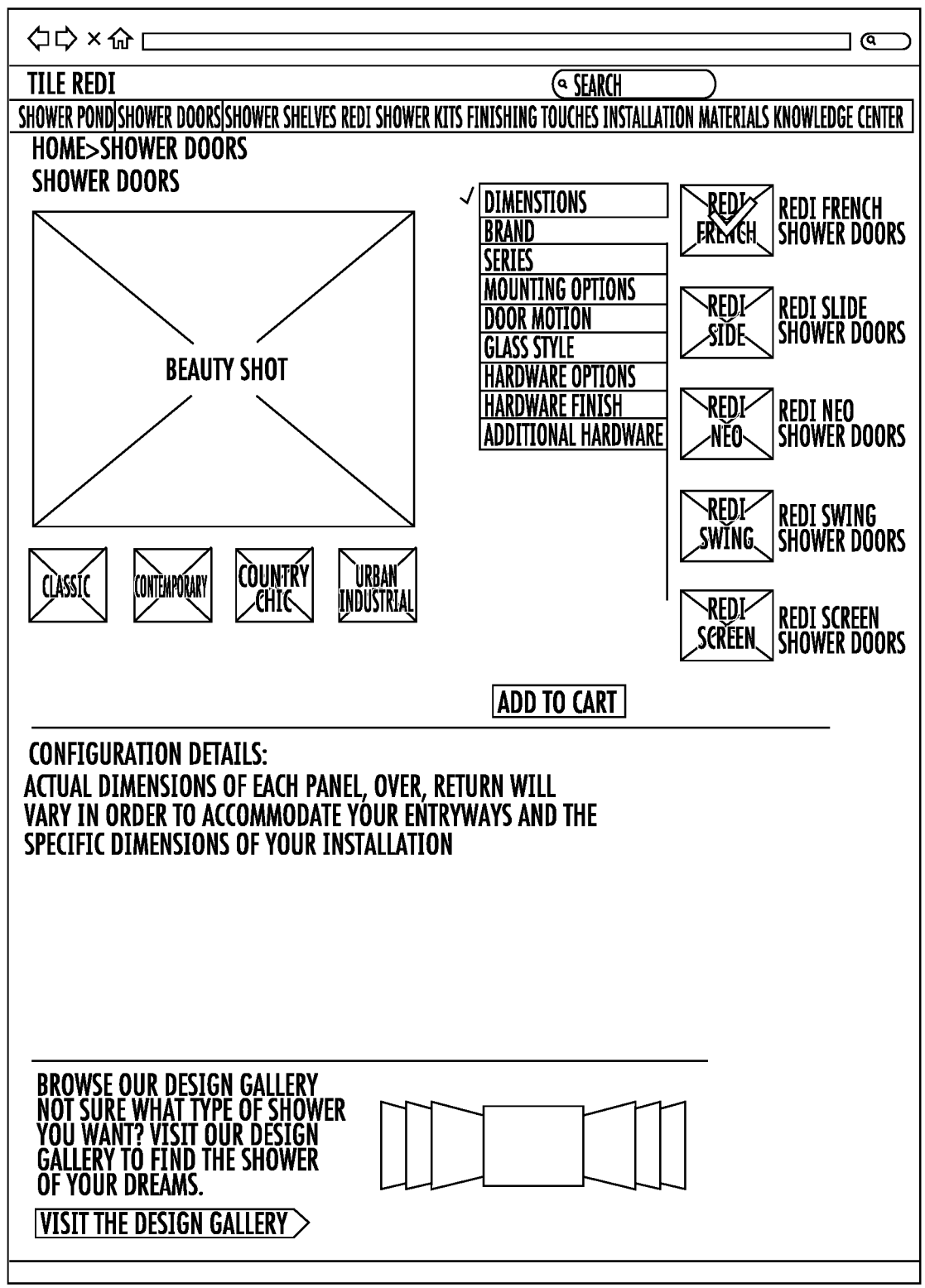
FIG. 3B shows a second wire frame of a sequence of an embodiment of the invention.
Figure 3C:
FIG. 3C shows a third wire frame of a sequence of an embodiment of the invention.
Figure 3D:
FIG. 3D shows a fourth wire frame of a sequence of an embodiment of the invention.
Figure 3E:
FIG. 3E shows a fifth wire frame of a sequence of an embodiment of the invention.
Figure 3F:
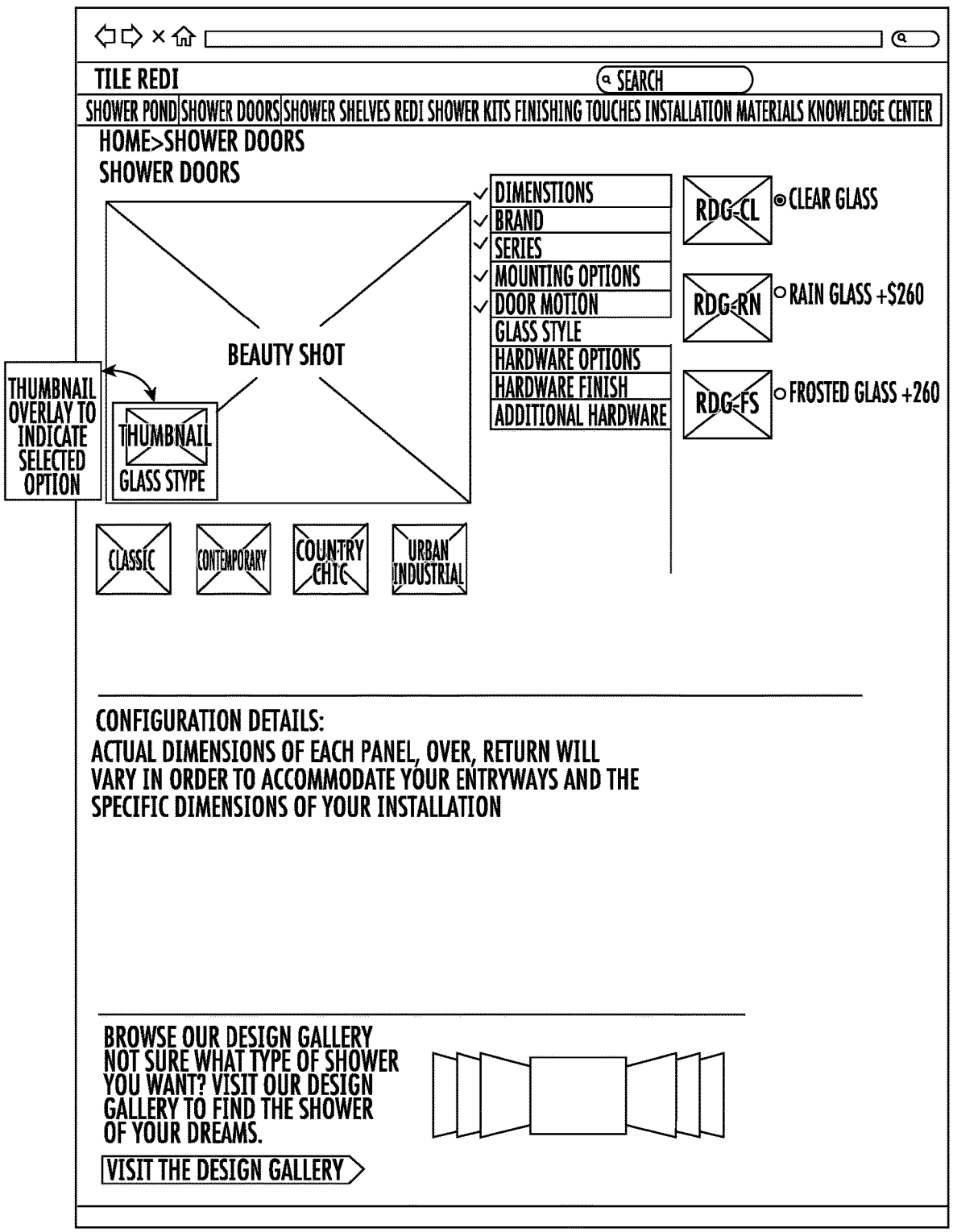
FIG. 3F shows a sixth wire frame of a sequence of an embodiment of the invention.
Figure 3G:
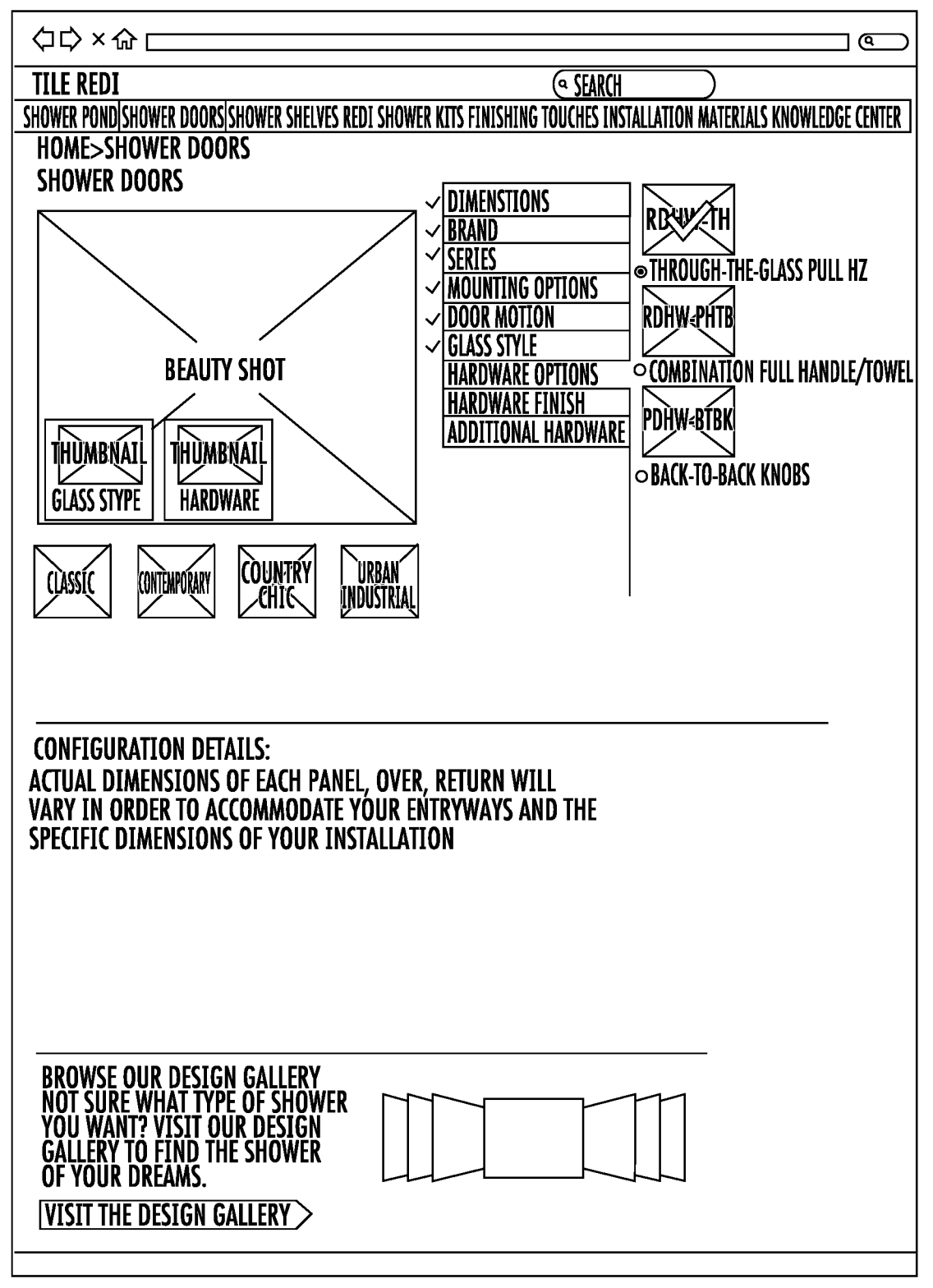
Figure 3H:
FIG. 3H shows an eighth wire frame of a sequence of an embodiment of the invention.
Figure 3I:
FIG. 3I shows a ninth wire frame of a sequence of an embodiment of the invention.

FIGS. 3B-3I show changes to the wireframes in this embodiment as the user progresses through a selection/design process. With respect to each product category being illustrated, the user can select an inventoried product or a custom product, or a combination of both. A plurality of customization options are made available from which to select (and customize if that feature is offered). The first visual representation area is then updated each time a selection is made using buttons 201-209. Upon customization of the first design options, the configuration details (i.e., the selected individual components and features such as those associated with buttons 201-209) are updated based on the user selections. The configuration details are compared against a database of available products, the database presents available SKU's corresponding to the selected features, and eliminates configuration details that are incompatible with the combination of configuration details chosen by the user up to that point. As with many of the embodiments disclosed herein, a customizable library system is employed, permitting the user to customize the presentation to change the sequencing of the products or experience, enlarge or shrink/reduce the number of products to be displayed, all to suite a particular user or circumstance. FIG. 3B illustrates the continued customization of the selected product, showing, for this embodiment, the design criteria based on the pan model. Based on the dimension chosen using the illustration of FIG. 3A, the first visual representation area presents the user with the available pan models that match a SKU based on the dimension selections chosen by the user. The user selects the pan model from within the separate graphical panel and the graphical panel 301 is updated by a base image for the selected pan. The updated configuration details are updated and then again compared against a database of available products. The database presents an updated list of available SKU's and design criteria to limit selection criteria of other customizable features.

FIGS. 3C-3I present further choices of the remaining configurations for the user to customize. For each customization, the graphical panel 302 is updated by the over layering of images over the base image, or otherwise combining the first image with other images, to provide a representation of the product being designed/created while in-progress or the finished product. In certain embodiments, at each customization step, the configuration information is compared to the database to determine available SKU's and limits the selection criteria to the latter design configurations based on the previous selection and available SKU's. Between each selection the available configurations shown in the 303 separate graphical panel are updated.

The disclosure of specific implementations of the inventions described herein is not intending to be limiting to the scope of the inventions. For example, the inventions have application to the design, selection and purchase of products for use in any background or environment, such as any other indoor setting as well as outdoor settings.

Custom Interfaces for Third Parties

The systems and methods of this invention may be implemented to market the products of third parties either separately or in conjunction with a third person's products. In one implementation thereof, a custom interface is established using the look, feel and/or branding of the third party. All or a portion of the products offered by the third party may be made available at the option of the third party. The process of displaying products being constructed, and components and/or accessories to be added, using one or more visual representation areas, is employed as described in this disclosure.

Exemplary Software Implementation

The present invention further includes novel elements for the handling and processing of user requests in the dynamic design of custom products. In at least one embodiment, a user selects at least one product to design, and said selection is stored in memory. A database of the products to design, optional criteria associated therewith, and design selections associated therewith, which are accessible to the custom software, are accessed, and the optional criteria and design selection, along with the specifications and images for modifying a base image, are accessed and stored in memory.

In at least one embodiment, the optional criteria is presented from memory in a column or frame for user selection of an optional criteria to customize. Upon selection of a first optional criteria, the remaining optional criteria and associated design selections are filtered based on available combinations with the selected first optional criteria selected. The available remaining optional criteria and design selections are then stored in a second memory location. It is to be appreciated that the first optional criteria remains modifiable, even after it is selected, based on the information stored in the first memory location. Thus, in the event that the first optional criteria is altered, the available remaining optional criteria and design selections based on the now altered first optional criteria are then stored in a second memory location.

In at least one embodiment, a plurality of memory locations exist which store refined data based on the previous selection(s) of optional criteria and/or design selections until a product is selected. Without being bound to a particular methodology, it is believed that providing the plurality of memory locations for storing of refined selectable optional criteria and design selections (along with associated specifications, SKU's and base image modifications therewith) allows for seamless transitions and 3D representation of the product under design as an optional criteria or a design selection is modified, ultimately until a single SKU remains available based on the previous selections of optional criteria and design selections associated therewith.

It should also be appreciated that, while modifying the base images to incorporate the optional criteria and design selections, such modifications alter the graphical representation of the product under design, while the image remains a composite of the base image along with all of the base image modifications incorporated into the base image based on the selection of the optional criteria and design selections associated therewith. This unique feature allows for the rapid transmission of graphical data while being able to design and configure an entire catalog of products, without having to store and transmit full images of each conceivable product, thus allowing for a true representation of a product under design in real-time without altering the view or location of the other selected optional criteria and design selections associated therewith.

Software Method for Custom Product Design

Figure 4A:
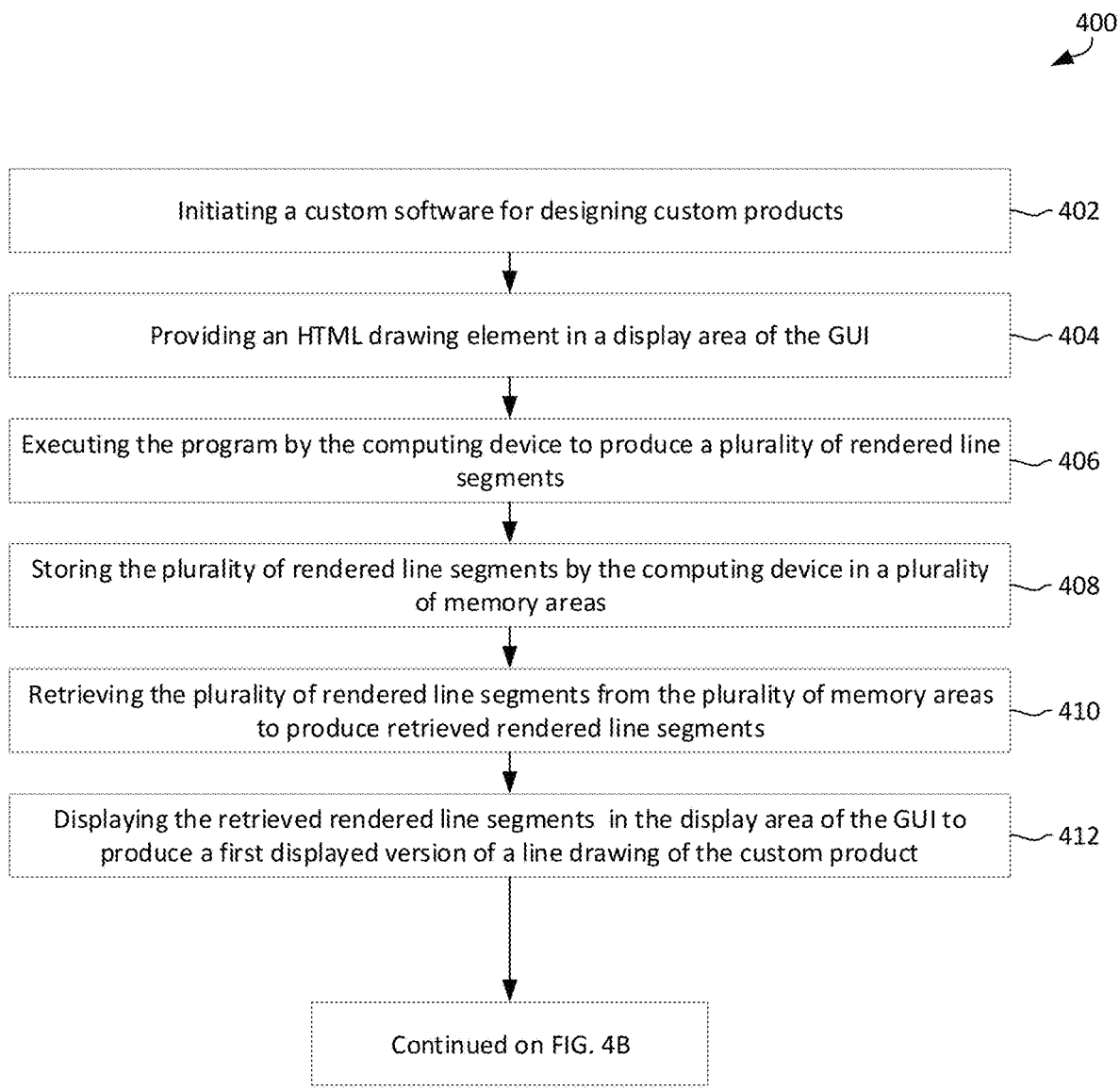
FIGS. 4A-4B illustrate a block flow diagram of a method of dynamically designing a custom product according to an embodiment of the present invention.
Figure 4B:
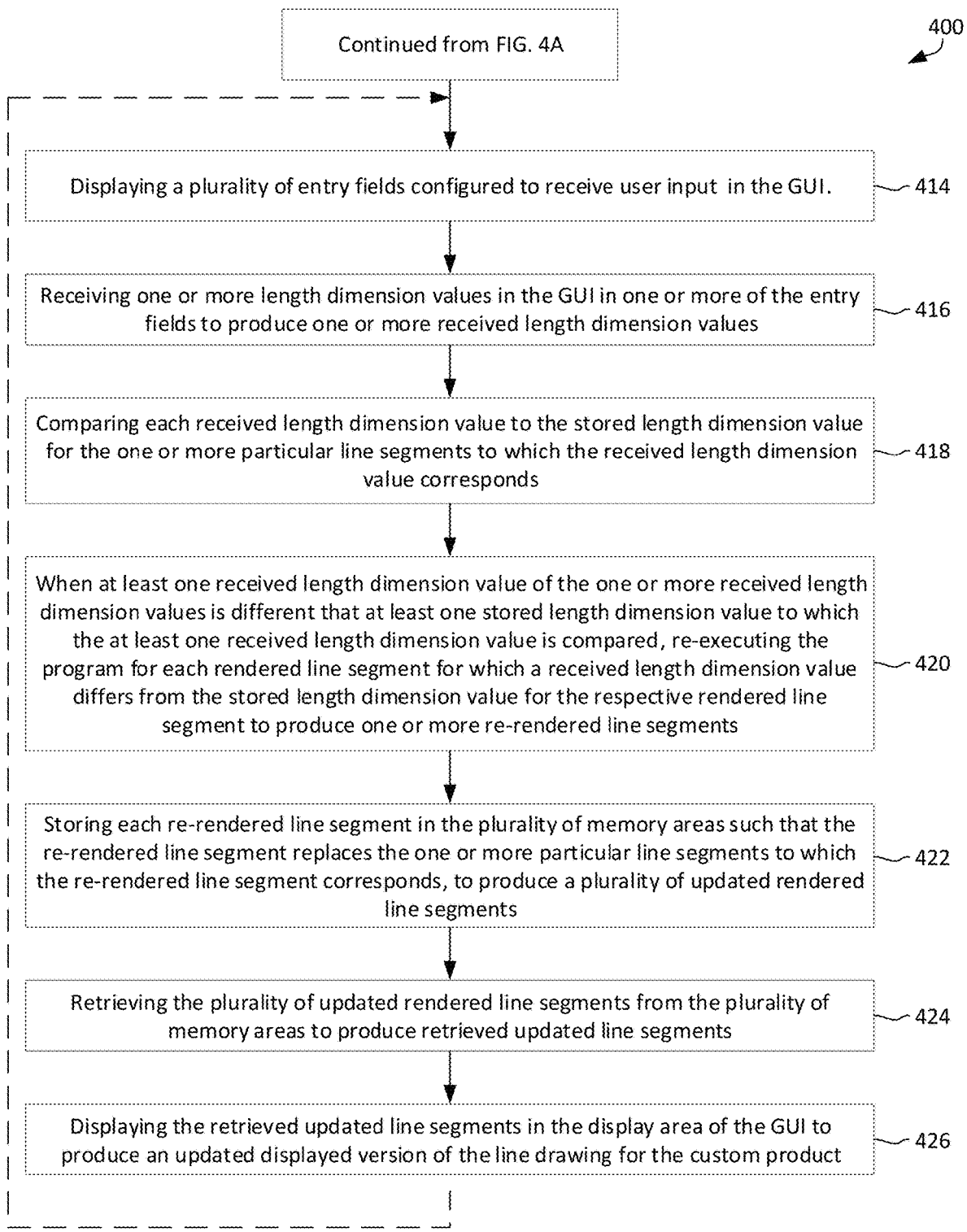

An embodiment of the present disclosure may provide a software-based method 400 for designing custom products. As shown in FIGS. 4A-4B, the method 400 may comprise the following steps.

At step 402, a custom software for designing custom products is initiated. The software may be installed on a computing device or may be accessed by the computing device through a web application. For example, the software may be accessed via a web browser installed on the computing device, or may be accessed by a browser of an application installed on the computing device. The custom software may permit user interaction via a graphical user interface (GUI).

At step 404, an HTML drawing element is provided in a display area of the GUI. The HTML drawing element may be configured to display graphics drawn using a program executable by the computing device. For example, the HTML drawing element may use the Canvas API to draw graphics using JavaScript. The program may comprise instructions to draw the custom product as a plurality of line segments. The plurality of line segments may correspond to object lines, construction lines, dimension lines, hidden lines, center lines, extension lines, phantom lines, cutting plane lines, break lines, leader lines, or section lines. Each of the plurality of line segments may have a corresponding length dimension value. The length dimension values may correspond to actual dimensions of the custom product. When drawing each of the plurality of line segments, the program may convert the length dimension values to pixel measurements based on the size of the display area.

At step 406, the program is executed by the computing device to produce a plurality of rendered line segments. The computing device may execute the program substantially simultaneously to initiating the custom software.

At step 408, the plurality of rendered line segments are stored by the computing device in a plurality of memory areas. The plurality of memory areas may be associated with the RAM of the computing device. Each rendered line segment and corresponding length dimension value may be stored in a respective memory area of the plurality of memory areas. Accordingly, the plurality of rendered line segments may be cached for later retrieval by the computing device. It can be appreciated that this caching step may improve execution time of the custom software by storing pre-rendered line segments.

At step 410, the plurality of rendered line segments are retrieved from the plurality of memory areas to produce retrieved rendered line segments. The retrieved rendered line segments may correspond to some or all of the plurality of rendered line segments.

At step 412, the retrieved rendered line segments are displayed in the display area of the GUI to produce a first displayed version of a line drawing of the custom product.

The retrieved rendered line segments may be displayed according to an animation loop. The animation loop may instruct the computing device to display the retrieved rendered line segments in a particular manner. For example, the animation loop may display the retrieved rendered line segments in a particular order, or in a particular portion of the display area. The first displayed version of the drawing includes some or all of the plurality of rendered line segments.

According to an embodiment of the present disclosure, the line drawing may be a wire-frame line drawing. The wire-frame line drawing may comprise a plurality of object lines displaying the bounds of the custom product, and a plurality of dimension lines displaying the dimensions of the custom product. It can be appreciated that by displaying the line drawing as a wire-frame line drawing, it may facilitate manufacturing of the custom product due to the presence of object lines and dimension lines.

By executing steps 402-412, shown in FIG. 4A, the method 400 provides a first displayed version of the custom product in the display area of the GUI. However, the first displayed version may rely on pre-configured length dimension values for each of the plurality of line segments. In order to achieve truly custom product design, the method 400 may comprise the following additional steps, shown in FIG. 4B, to update the custom product design using user-configured length dimension values.

At step 414, a plurality of entry fields configured to receive user input are displayed in the GUI. Each entry field may correspond to one or more particular line segments of the plurality of rendered line segments. For example, an entry field may correspond to a depth dimension or width dimension of the custom product. The depth or width dimension may correspond to one or more object lines, construction lines, dimension lines, hidden lines, center lines, extension lines, phantom lines, cutting plane lines, break lines, leader lines, or section lines. Each entry field may permit entry of a length dimension value for the one or more particular line segments by a user of the GUI. For example, each entry field may be a dialog box, a drop-down box, a selectable button, a slider, or any other GUI element which permits user-defined entry of a length dimension value or user-defined selection of one of a preset range of length dimension values.

According to an embodiment of the present disclosure an entry field may correspond to a particular feature of the custom product. The particular feature may correspond to one or more particular line segments of the plurality of rendered line segments. The entry field may add or remove the particular feature of the custom product. For example, in a particular embodiment where the custom product is a shower pan, the particular feature may be an entrance curb. Accordingly, the entry field may permit user selection of various options for the particular feature, including "single curb," "double curb left," "double curb right," and "barrier-free." By selecting one of these options, the particular line segments that correspond to each of these features may be added or removed from the custom product.

According to an embodiment of the present disclosure, the plurality of entry fields may be displayed in the GUI in a particular order. It may be desirable to guide the user through different sets of entry fields for efficient design of the custom product. For example, user experience may be improved when the user can proceed through the entry fields in a single process, without needing to modify earlier selections based on subsequent selections. In a particular embodiment where the custom product is a shower pan, the plurality of entry fields may be provided to guide the user to make the following ordered selections: (1) dimensions, including overall depth and width; (2) drain position, including distance from back wall and side wall; (3) drain type, including brand and drain style; and (4) hardware finishes. It can be appreciated that by providing the plurality of entry fields in this order, a user may quickly and efficiently design the custom product.

At step 416, one or more length dimension values are received in the GUI in one or more of the entry fields to produce one or more received length dimension values. Depending on the particular entry field design, the one or more length dimension values may be received as a dialog entry, a drop-down selection, a button selection, a slider position, etc.

At step 418, each received length dimension value is compared to the stored length dimension value for the one or more particular line segments to which the received length dimension value corresponds.

At step 420, when at least one received length dimension value of the one or more received length dimension values is different that at least one stored length dimension value to which the at least one received length dimension value is compared, the program is re-executed for each rendered line segment for which a received length dimension value differs from the stored length dimension value for the respective rendered line segment to produce one or more re-rendered line segments. According to step 420, the program may only be re-executed for the rendered line segments that are modified by the user input. In this way, system resources may be saved, and program execution time may be improved.

At step 422, each re-rendered line segment are stored in the plurality of memory areas such that the re-rendered line segment replaces the one or more particular line segments to which the re-rendered line segment corresponds, to produce a plurality of updated rendered line segments. Each re-rendered line segment and corresponding length dimension value may be stored in a respective memory area of the plurality of memory areas. Accordingly, the plurality of re-rendered line segments may be cached for later retrieval by the computing device, along with rendered line segments previously stored. It can be appreciated that this caching step may improve execution time of the custom software by storing updated rendered line segments.

At step 424, the plurality of updated rendered line segments are retrieved from the plurality of memory areas to produce retrieved updated line segments. The retrieved updated line segments may correspond to some or all of the updated rendered line segments.

At step 426, the retrieved updated line segments are displayed in the display area of the GUI to produce an updated displayed version of the line drawing for the custom product. The retrieved updated line segments may be displayed according to the animation loop. The animation loop may instruct the computing device to display the updated rendered line segments in a particular manner. For example, the animation loop may display the updated rendered line segments in a particular order, or in a particular portion of the display area. The updated displayed version of the drawing may include some or all of the plurality of rendered line segments.

By executing steps 414-426, the method 400 provides an updated displayed version of the custom product in the display area of the GUI. This may allow the user to achieve truly custom product design, by updating the custom product design using user-configured length dimension values.

Steps 414-426 may be repeated by the user. In this way, the user may be able to continually input length dimension values in the plurality of entry areas to further modify the line drawing of the custom product until a desired design is displayed.

According to an embodiment of the present disclosure, the line drawing of the custom product may comprise a plurality of views. For example, the plurality of views may include one or more of a top view, bottom view, front view, rear view, left side view, and right-side view of the custom product. The plurality of views may further include a sectional view or a detail view corresponding to the top view, bottom view, front view, rear view, left side view, or right-side view of the custom product. The plurality of views may further include an isometric view of the custom product. The plurality of views may be displayed substantially simultaneously in the display area of the GUI. Alternatively, one or more of the plurality of views may be displayed in the display area of the GUI at once, and the user may be able to selectively switch to display the other of the plurality of views by a switch, button, tab, or slider provided in the GUI.

According to an embodiment of the present disclosure, the line drawing of the custom product may comprise a first view, a second view, and a third view of the custom product. The first view may correspond to a top view of the custom product. The second view may correspond to a sectional side view of the custom product. The third view may correspond to a sectional front view of the custom product. It can be appreciated that a standard engineering drawing may comprise front, top, and right-side views of a custom product, as these three views may sufficiently define the dimensions of the custom product for manufacturing. Accordingly, the method of the present disclosure may provide the first view, second view, and third view of the custom product in order to facilitate manufacturing of the custom product. The first view, second view, and third view, may be displayed substantially simultaneously in the display area of the GUI.

According to an embodiment of the present disclosure, the program may be limited by constraints. The constraints may limit the length dimension values of the plurality of line segments. For example, when the one or more received length dimension values conflict with the constraints, the program may not re-execute the program. An error message may be displayed in the GUI according to the conflict.

The constraints may comprise physical constraints. The physical constraints may be defined by manufacturing capability of the custom product. For example, certain dimensions of the custom product may be limited by the manufacturing processes used to produce the custom product. In a particular embodiment where the custom product is a shower pan, the overall depth and width may have upper and lower ranges of permissible length dimensions, or the drain position may have a minimum distance from the front, rear, and side walls. When the received length dimension conflicts with the upper and lower ranges of permissible length dimensions or the minimum distance from the walls, the program may not re-execute the program, and an error message may be displayed in the GUI.

The constraints may comprise user constraints. The user constraints may be defined by a type of user making the user selection. For example, it may be desirable to allow different types of users to have different amounts of flexibility when designing the custom product. For example, the type of user may be an in-house designer, a retailer, or an end user. It can be appreciated that an in-house designer may have the greatest flexibility when designing the custom product, while a retailer and an end user may have reduced flexibility when designing the custom product. Flexibility may correspond to the incremental precision of received length dimensions. For example, a first type of user may be permitted to enter length dimensions at the precision of tenths, hundredths, or thousandths of an inch, centimeter, or other dimensions. A second type of user may be permitted to enter length dimensions at a smaller precision, for example, of quarter or half inch or other dimensions. A third type of user may be permitted to enter length dimensions at an even smaller precision, for example, by inch or other limited dimensions. When the received length dimension conflicts with the precision permitted of the particular type of user, the program may not re-execute the program, and an error message may be displayed by the GUI.

When initiating the custom software, the method may further comprise determining the type of user. The type of user may be determined by a registration/log-in process performed by the user. According to the determined type of user, user constraints may be implemented into the program.

According to an embodiment of the present disclosure, the user input may be limited by the constraints. For example, where the plurality of entry fields allows user-defined selection of one of a preset range of length dimension values, the constraints may limit the selectable options provided in the preset range of length dimension values.

According to an embodiment of the present disclosure, the method 400 may comprise the following additional steps.

At step 428, a customer information entry field is displayed via the GUI. The customer information entry field may be a dialog box configured to receive user-defined input. For example, the user may input a customer name, company name, address, and contact information for the user or customer. The customer information entry field may also be configured to receive a customer signature. For example, the customer information entry field may permit the user to type or draw a signature in the customer information entry field.

At step 430, a customer signature is received in the customer information entry field of the GUI. The customer signature may be input by the user by typing, drawings, or otherwise inserting the customer signature into the customer information entry field.

With steps 428-430, a customer signature may be received, and is associated with the updated displayed version of the line drawing for the custom product. It can be appreciated that a signature may be required for approval of the custom product design in order to proceed with manufacturing of the custom product.

According to an embodiment of the present disclosure, the method 400 may comprise the following additional steps.

At step 432, the updated displayed version of the line drawing is compared to line drawings of generic products to determine a generic product most similar to the custom product. It can be appreciated that it may be difficult to determine a price of a custom product versus the price of a generic product. Thus, it may be helpful to determine a generic product most similar to the custom product to assist in price determination. Comparing the updated displayed version of the line drawing to line drawings of generic products may include comparing length dimension values of each of the plurality of line segments that comprise each of the updated displayed version of the line drawing of the custom product to line drawings of generic products. A generic product with the fewest or smallest deviations from the custom product may be selected as the generic product most similar to the custom product. In addition, one or more generic products may be selected as being most similar to the custom product.

At step 434, a price of the custom product is determined according to the generic product most similar to the custom product. The price may be determined by a pricing algorithm. The pricing algorithm may be part of the program. The pricing algorithm may comprise a number a weighted factors, including the price of the generic product, the number and extent of the differences between the updated displayed version of the line drawing and the line drawing of the generic product, and the type of user/customer designing the custom product. The pricing algorithm may determine a plurality of prices for the custom product using more than one generic product selected as being most similar to the custom product. In this way, the price for the custom product may be selected from one of the plurality of prices for the custom product.

At step 436, the price of the custom product is displayed in the GUI. For example, the price of the custom product may be displayed with a purchase button. By selecting the purchase button, the user may initiate a purchase of the custom product based on the update displayed version of the line drawing of the custom product and the price of the custom product.

Steps 432-436 may be repeated for each received length dimension value. In this way, the price of the custom product may be updated each time that the design of the custom product is updated.

According to an embodiment of the present disclosure, steps 412 and/or 416 of the method 400 may comprise the following steps.

At step 438, the retrieved rendered line segments are scaled based on a screen size of the computing device to obtain scaled line segments. The retrieved rendered line segments may be scaled via a scaling algorithm. The scaling algorithm may be part of the program. The scaling algorithm may comprise a number of weighted factors, including the screen size of the computing device, the length dimension values of the retrieved rendered line segments, and the percentage of the screen desired to display the line drawing. It can be appreciated that the computing device may have various screen sizes, and it may be necessary to scale the line drawing to fit the screen. In addition, it may be desirable to maintain a certain percentage of the screen as being occupied by the line drawing, regardless of the length dimension values of the line segments. For example, it may be desirable to maintain the same relative size of the line drawing on the screen when the received length dimension values make the line drawing smaller or larger. Thus, the scaling algorithm may scale the retrieved rendered line segments to obtain scaled line segments, which may ensure visibility of the line drawing after each change. Similar scaling operations can be performed on the retrieved updated line segments At step 440, the scaled line segments are displayed in the display area of the GUI. Accordingly, the first displayed version of a line drawing of the custom product may comprise the scaled line segments. Similarly, the updated displayed version of the custom product may comprise the scaled line segments.

With steps 438-440, the first displayed version and the updated displayed version of the custom product can be scaled for improved display on the display area of the computing device.

According to an embodiment of the present disclosure, steps 422-426 of the method 400 may further comprise the following steps.

At step 422a, the received length dimension value for each re-rendered line segment is stored. The received length dimension value may be stored in the memory area of the plurality of memory areas corresponding to the stored re-rendered line segment to which the received length dimension value corresponds.

At step 424a, the stored length dimension value for each of the updated rendered line segments are retrieved to produce retrieved updated length dimension values. The retrieved length dimension values may correspond to some or all of the updated rendered line segments. For example, the retrieved length dimension values may correspond to the dimension lines of the updated rendered line segments.

At step 426a, the retrieved updated line segments are displayed together with at least the retrieved updated length dimension values. Accordingly, the first updated displayed version of the line drawing for custom product includes a plurality of line segments and length dimension values. It can be appreciated that the updated displayed version of the line drawing for the custom product may be a fabrication drawing for the custom product. A fabrication drawing may include line segments defining the custom product and corresponding length dimensions to aid in fabrication of the custom product.

With steps 422a-426a, the method 400 of the present disclosure may produce a fabrication drawing of the custom product, based on the user's custom specifications. The fabrication drawing of the custom product may be submitted to a manufacturer to fabricate the custom product.

According to an embodiment of the present disclosure, the plurality of memory areas used for storing rendered and re-rendered line segments may be external to memory used for displaying the first displayed version of the line drawing and the updated displayed version of the line drawing. By using separate memory areas, processing of the method 400 by the computing device may be improved.

According to an embodiment of the present disclosure, the method 400 may further comprise the following steps between steps 418 and 420.

At step 419a, an intermediate length dimension value is determined between each received length dimension value and the stored length dimension value for the one or more particular line segments to which the received length dimension value corresponds. The intermediate length dimension value may be a percentage of the difference between the received length dimension value and the stored length dimension value. For example, the percentage may be 1% and 99%, and any percentage in between. The intermediate length dimension value may be set increments of the difference between the received length dimension value and the stored length dimension value. For example, the set increments can be quarter-inch, half-inch, inch, or any other increment.

At step 419b, the program is re-executed for each rendered line segment with an intermediate length dimension value to produce one or more intermediately-rendered line segments.

At step 419c, each intermediately-rendered line segment is stored in the plurality of memory areas such that the intermediately-rendered line segment replaces the one or more particular line segments to which the intermediately-rendered line segment corresponds, to produce a plurality of intermediately-updated rendered line segments.

At step 419d, the plurality of intermediately-updated rendered line segments are retrieved from the plurality of memory areas to produce retrieved intermediately-updated line segments.

At step 419*e*, the retrieved intermediately-updated line segments are displayed in the display area of the GUI to produce an intermediately-updated displayed version of the line drawing for the custom product. The retrieved intermediately-updated line segments may be displayed according to the animation loop. The method 400 may then proceed to step 420.

With steps 419*a*-419*e*, the method 400 of the present disclosure may display the intermediately-updated displayed version of the line drawing for the custom product before displaying the updated displayed version of the line drawing. In this way, the display may be viewed as an animation, dynamically changing from the first displayed version to the updated displayed version.

Steps 419*a*-419*e* may be repeated multiple times before proceeding to step 420. Accordingly, more than one intermediate length dimension value may be determined. For example, intermediate length dimension values at varying percentages or set increments may be determined between the received length dimension value and the stored length dimension value. In a particular embodiment, the intermediate length dimension value may increase or decrease by a set increment with each loop of steps 419*a*-419*e*. It can be appreciated that the more loops and finer increments used, the animation of the display may be smoother, as the display is dynamically updated from the first displayed version to the updated displayed version.

With the method 400 of the present disclosure, a user may dynamically design a custom product. It can be appreciated that the method 400 may be user-friendly, with intuitive and easy operation. The updated displayed line drawing of the custom product may be a fabrication drawing used to manufacture the custom product based on the user's specifications. It can be appreciated that in prior art methods, CAD experience may be required to create a fabrication drawing, but with the method 400, an untrained, lay-user may create a fabrication drawing based on their designed custom product, and may directly submit the fabrication drawing to the manufacturer for fabrication. This may save time for the manufacturer, which may generally need to produce a fabrication drawing internally based on a customer's specifications. The method 400 may also generate a price for the custom product, based on the updated displayed line drawing. It can be appreciated that directly displaying and updating the price to the user may save time compared to prior art methods, where a price would need to be determined by the manufacturer for each custom product design, which takes additional time.

In contrast to prior art methods, which may rely on off-the-shelf parts, the method 400 may create a truly-custom product, having user-defined dimensions. This may increase the number of possibilities for the custom product, which may increase user satisfaction.

Example 2

Figure 5:
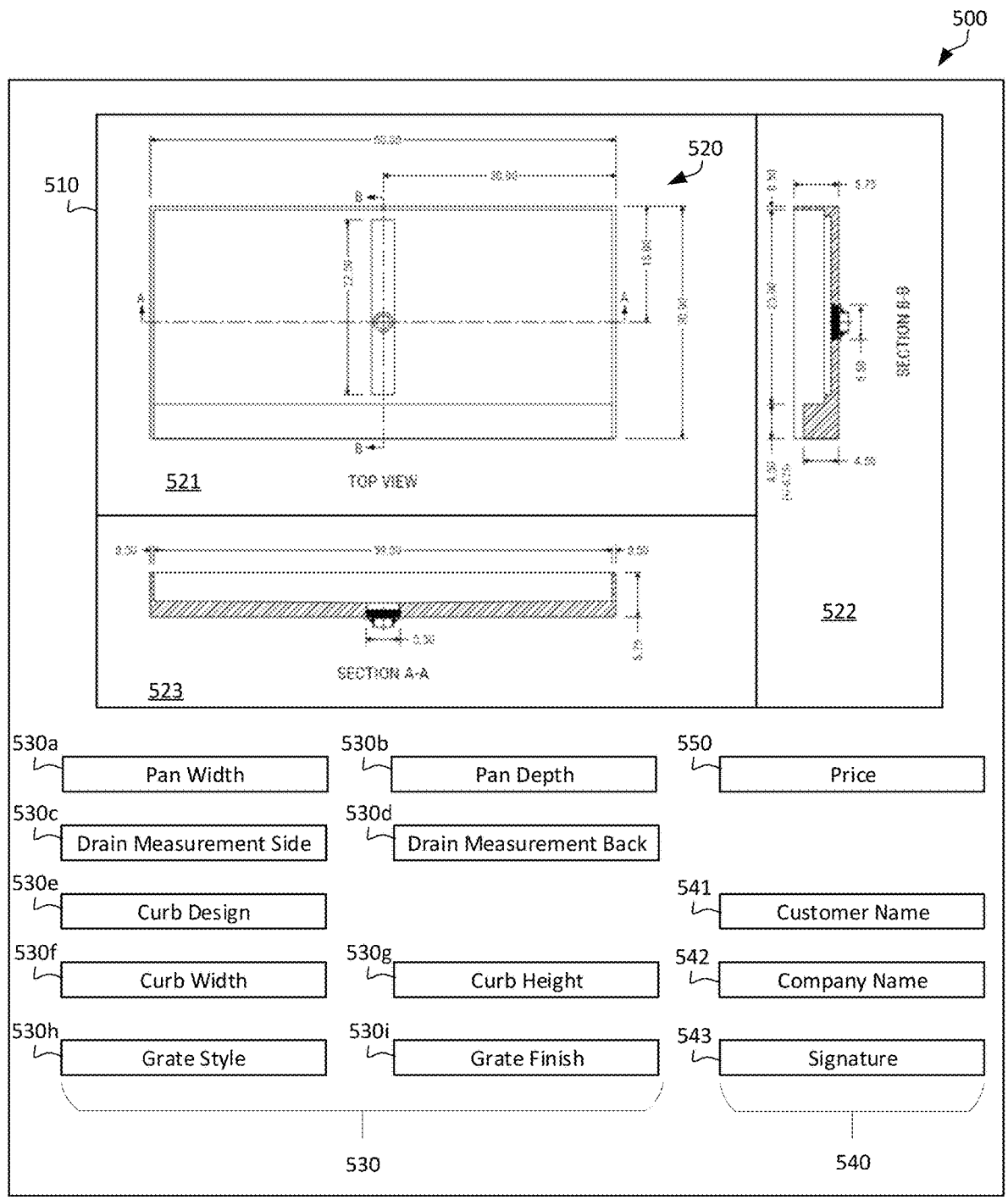
FIG. 5 illustrates an example display interface used in connection with a method of dynamically designing a custom product according to an embodiment of the present invention.

The systems and methods of the present disclosure have useful application to the design and ordering of household goods, such as kitchen and bathroom fixtures, appliances, and other constructs. As shown in FIG. 5, a custom software for dynamically designing custom products may be embodied in the display interface 500. The display interface may comprise an HTML drawing element 510 configured to display graphics drawn using a program. The program may comprise instructions to draw the custom product as a plurality of line segments, each having a corresponding length dimension value.

The display interface 500 may further comprise a line drawing of the custom product 520, drawn in the HTML drawing element 510. In the particular embodiment shown in FIG. 5, the custom product is a shower pan. The line drawing of the custom product 520 may include a plurality of views. For example, the line drawing of the custom product 520 may comprise a first view 521, as second view 522, and a third view 523. The first view 521 may correspond to a top view of the custom product. The second view 522 may correspond to a sectional side view of the custom product. The third view 533 may correspond to a sectional front view of the custom product. The line drawing of the custom product 520 may include object lines and dimensions of the custom product. In this way, the line drawing of the custom product 520 may be a fabrication drawing for the custom product.

The display interface 500 may further comprise a plurality of entry fields 530. Each of the plurality of entry fields 530 may correspond to one or more particular line segments of the line drawing of the custom product 520. The plurality of entry fields 530 may be configured to receive user input. For example, the plurality of entry fields 530 may be configured to receive a length dimension value input by the user. The line drawing for the custom product 520 may be updated according to the length dimension value received in one or more of the entry fields 530.

The plurality of entry fields 530 may comprise: pan width 530*a*, pan depth 530*b*, drain measurement side 530*c*, drain measurement back 530*d*, curb design 530*e*, curb width 530*f*, curb height 530*g*, grate style 530*h*, and grate finish 530*i*.

The display interface 500 may further comprise customer information fields 540, which may include customer name 541, company name 542, and customer signature 543 fields. The customer information fields 540 may be configured to receive user input.

The display interface 500 may further comprise a price field 550. The price field 550 may display a price determined for the custom product according to the line drawing for the custom product 520.

With the display interface 500, a user can generate a line drawing of a custom product 520, determine a price for the custom product by the price field 550, and approve the design and price to submit to manufacturing with the customer information fields 540. It can be appreciated that the display interface 500 is user-friendly, intuitive, and does not require CAD experience to operate.

Non-Transitory Computer-Readable Storage Medium

An embodiment of the present disclosure may provide a non-transitory computer-readable storage medium having stored thereon instruction that, when executed by a processor of a computing device, cause the processor to perform the method 400 described above.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

Although this disclosure has been described in terms of certain embodiments and generally associated methods, alterations and permutations of these embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A software-based based method for dynamically designing a custom product, the method comprising:
    initiating custom software for designing custom products, the software being installed on a computing device or accessed by the computing device through a web application, the custom software permitting user interaction therewith via a graphical user interface (GUI);
    providing an HTML drawing element in a display area of the GUI, configured to display graphics drawn using a program executable by the computing device, the program comprising instructions to draw the custom product as a plurality of line segments, each having a corresponding length dimension value;
    executing, by the computing device, the program to produce a plurality of rendered line segments;
    storing, by the computing device, the plurality of rendered line segments in a plurality of memory areas such that each rendered line segment and corresponding length dimension value is stored in a respective memory area of the plurality of memory areas;
    retrieving the plurality of rendered line segments from the plurality of memory areas to produce retrieved rendered line segments;
    displaying, according to an animation loop, the retrieved rendered line segments in the display area of the GUI to produce a first displayed version of a line drawing of the custom product, the first displayed version of the line drawing including the plurality of rendered line segments;
    displaying, via the GUI, a plurality of entry fields configured to receive user input, each entry field corresponding to one or more particular line segments of the plurality of rendered line segments and permitting entry of a length dimension value for the one or more particular line segments by a user of the GUI;
    receiving, via the GUI, one or more length dimension values in one or more of the plurality of entry fields to produce one or more received length dimension values;
    comparing each received length dimension value to the stored length dimension value for the one or more particular line segments to which the received length dimension value corresponds;
    when at least one received length dimension value of the one or more received length dimension values is different than at least one stored length dimension value to which the at least one received length dimension value is compared, re-executing the program for each rendered line segment for which a received length dimension value differs from the stored length dimension value for the respective rendered line segment to produce one or more re-rendered line segments;
    storing each re-rendered line segment in the plurality of memory areas such that the re-rendered line segment replaces the one or more particular line segments to which the re-rendered line segment corresponds, to produce a plurality of updated rendered line segments;
    retrieving the plurality of updated rendered line segments from the plurality of memory areas to produce retrieved updated line segments; and
    displaying, according to the animation loop, the retrieved updated line segments in the display area of the GUI to produce an updated displayed version of the line drawing for the custom product.

2. The method of claim 1, wherein the line drawing of the custom product comprises:
    a first view corresponding to a top view of the custom product;
    a second view corresponding to a sectional side view of the custom product; and
    a third view corresponding a sectional front view of the custom product.

3. The method of claim 2, wherein the first view, the second view, and the third view are simultaneously displayed in the display area of the GUI.

4. The method of claim 1, wherein the line drawing is a wire-frame line drawing.

5. The method of claim 1, wherein the plurality of entry fields are dialog boxes and the user input comprises a user-defined input in one or more of the dialog boxes.

6. The method of claim 1, wherein the program is limited by constraints, the constraints comprising:
    physical constraints, defined by manufacturing capability of the custom product.

7. The method of claim 6, wherein the constraints further comprise:
    user constraints, defined by a type of a user making the user selection.

8. The method of claim 6, wherein the user input is limited by the constraints.

9. The method of claim 1, further comprising:
    displaying, via the GUI, customer information entry field; and
    receiving, via the GUI, a customer signature in the customer information entry field.

10. The method of claim 1, further comprising:
    comparing the updated displayed version of the line drawing to line drawings of generic products to determine a generic product most similar to the custom product;
    determining, via a pricing algorithm, a price of the custom product according to the generic product most similar to the custom product;
    displaying, via the GUI, the price of the custom product.

11. The method of claim 1, wherein displaying the retrieved rendered line segments in the display area of the GUI comprises:
    scaling, via a scaling algorithm, the retrieved rendered line segments based on a screen size of the computing device to obtain scaled line segments; and
    displaying the scaled line segments in the display area of the GUI.

12. The method of claim 1, wherein the HTML drawing element is an HTML5 Canvas element.

13. The method of claim 1, wherein storing each re-rendered line segment in the plurality of memory areas further comprises:
    storing the received length dimension value for the re-rendered line segment.

14. The method of claim 13, wherein retrieving the plurality of updated rendered line segments from the plurality of memory areas further comprises:

retrieving the stored length dimension value for each of the updated rendered line segments to produce retrieved updated length dimension values.

15. The method of claim 14, wherein displaying the retrieved updated line segments comprises:
displaying the retrieved updated line segments together with at least the retrieved updated length dimension values, such that the updated displayed version of the line drawing for the product is a fabrication drawing for the product.

16. The method of claim 1, wherein the plurality of memory areas used for storing rendered and re-rendered line segments are external to memory used for displaying the first and updated displayed versions of the line drawing.

17. The method of claim 1, wherein before re-executing the program for each rendered line segment for which a received length dimension value differs from the stored length dimension value for the respective rendered line segment, the method further comprises:
determining an intermediate length dimension value between each received length dimension value and the stored length dimension value for the one or more particular line segments to which the received length dimension value corresponds;
re-executing the program for each rendered line segment with an intermediate length dimension value to produce one or more intermediately-rendered line segments;
storing each intermediately-rendered line segment in the plurality of memory areas such that the intermediately-rendered line segment replaces the one or more particular line segments to which the intermediately-rendered line segment corresponds, to produce a plurality of intermediately-updated rendered line segments;
retrieving the plurality of intermediately-updated rendered line segments from the plurality of memory areas to produce retrieved intermediately-updated line segments; and
displaying, according to the animation loop, the retrieved intermediately-updated line segments in the display area of the GUI to produce an intermediately-updated displayed version of the line drawing for the custom product.

18. A non-transitory computer-readable storage medium having stored thereon instruction that, when executed by a processor of a computing device, cause the processor to perform a method comprising:
initiating custom software for designing custom products, the software being installed on the computing device or accessed by the computing device through a web application, the custom software permitting user interaction therewith via a graphical user interface (GUI);
providing an HTML drawing element in a display area of the GUI, configured to display graphics drawn using a program executable by the computing device, the program comprising instructions to draw the custom product as a plurality of line segments, each having a corresponding length dimension value;
executing, by the computing device, the program to produce a plurality of rendered line segments;
storing, by the computing device, the plurality of rendered line segments in a plurality of memory areas such that each rendered line segment and corresponding length dimension value is stored in a respective memory area of the plurality of memory areas;
retrieving the plurality of rendered line segments from the plurality of memory areas to produce retrieved rendered line segments;
displaying, according to an animation loop, the retrieved rendered line segments in the display area of the GUI to produce a first displayed version of a line drawing of the custom product, the first displayed version of the line drawing including the plurality of rendered line segments;
displaying, via the GUI, a plurality of entry fields configured to receive user input, each entry field corresponding to one or more particular line segments of the plurality of rendered line segments and permitting entry of a length dimension value for the one or more particular line segments by a user of the GUI;
receiving, via the GUI, one or more length dimension values in one or more of the plurality of entry fields to produce one or more received length dimension values;
comparing each received length dimension value to the stored length dimension value for the one or more particular line segments to which the received length dimension value corresponds;
when at least one received length dimension value of the one or more received length dimension values is different than at least one stored length dimension value to which the at least one received length dimension value is compared, re-executing the program for each rendered line segment for which a received length dimension value differs from the stored length dimension value for the respective rendered line segment to produce one or more re-rendered line segments;
storing each re-rendered line segment in the plurality of memory areas such that the re-rendered line segment replaces the one or more particular line segments to which the re-rendered line segment corresponds, to produce a plurality of updated rendered line segments;
retrieving the plurality of updated rendered line segments from the plurality of memory areas to produce retrieved updated line segments; and
displaying, according to the animation loop, the retrieved updated line segments in the display area of the GUI to produce an updated displayed version of the line drawing for the custom product.

* * * * *